(12) United States Patent
Sharma et al.

(10) Patent No.: US 7,877,545 B2
(45) Date of Patent: *Jan. 25, 2011

(54) ONLINE RESTRIPING TECHNIQUE FOR DISTRIBUTED NETWORK BASED VIRTUALIZATION

(75) Inventors: Samar Sharma, Sunnyvale, CA (US); Dinesh Dutt, Sunnyvale, CA (US); Sanjaya Kumar, Fremont, CA (US); Umesh Mahajan, Cupertino, CA (US); Thomas J. Edsall, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 12/206,475

(22) Filed: Sep. 8, 2008

(65) Prior Publication Data

US 2009/0006746 A1    Jan. 1, 2009

Related U.S. Application Data

(63) Continuation of application No. 11/146,457, filed on Jun. 6, 2005, now Pat. No. 7,437,507.

(51) Int. Cl.
*G06F 12/00* (2006.01)

(52) U.S. Cl. ............... 711/114; 711/150; 711/165; 711/170; 714/7

(58) Field of Classification Search ............. 711/114, 711/150, 165, 170; 714/7
See application file for complete search history.

(56) References Cited

U.S. PATENT DOCUMENTS

| | | | |
|---|---|---|---|
| 5,502,836 A | 3/1996 | Hale et al. | |
| 5,875,456 A * | 2/1999 | Stallmo et al. | 711/114 |
| 5,933,834 A | 8/1999 | Aichelen | |
| 6,330,625 B1 | 12/2001 | Bridge | 707/10 |
| 6,529,997 B1 | 3/2003 | Debiez et al. | 710/39 |
| 6,708,237 B1 | 3/2004 | Bridge | 711/114 |
| 6,745,286 B2 | 6/2004 | Staub et al. | 710/39 |
| 6,754,773 B2 | 6/2004 | Ulrich et al. | 711/114 |
| 6,775,792 B2 | 8/2004 | Ulrich et al. | |
| 2002/0035732 A1 | 3/2002 | Zetts | 725/148 |
| 2002/0124137 A1 | 9/2002 | Ulrich | 711/113 |
| 2002/0138559 A1 | 9/2002 | Ulrich | 709/203 |
| 2002/0156840 A1 | 10/2002 | Ulrich | 709/203 |
| 2002/0156891 A1 | 10/2002 | Ulrich | 709/203 |
| 2002/0156973 A1 | 10/2002 | Ulrich | 709/225 |
| 2002/0156974 A1 | 10/2002 | Ulrich | 711/114 |
| 2002/0156975 A1 | 10/2002 | Staub | 711/114 |

(Continued)

OTHER PUBLICATIONS

International Search Report and Written Opinion for PCT/US06/22041, mailed Oct. 29, 2007.

(Continued)

*Primary Examiner*—Stephen C Elmore
(74) *Attorney, Agent, or Firm*—Weaver Austin Villeneuve & Sampson LLP

(57) ABSTRACT

A technique is provided for implementing online restriping of a volume in a storage area network. A first instance of the volume is instantiated at a first port of the fibre channel fabric for enabling I/O operations to be performed at the volume. While restriping operations are being performed at the volume, the first port is able to concurrently perform I/O operations at the volume.

24 Claims, 14 Drawing Sheets

U.S. PATENT DOCUMENTS

| | | | |
|---|---|---|---|
| 2002/0161520 A1 | 10/2002 | Dutta | 711/114 |
| 2002/0161846 A1 | 10/2002 | Ulrich | 701/213 |
| 2002/0161850 A1 | 10/2002 | Ulrich | 709/213 |
| 2002/0161973 A1 | 10/2002 | Ulrich | 709/214 |
| 2002/0165942 A1 | 11/2002 | Ulrich | 711/114 |
| 2002/0166026 A1 | 11/2002 | Ulrich | 709/219 |
| 2002/0166079 A1 | 11/2002 | Ulrich | 711/114 |
| 2002/0169827 A1 | 11/2002 | Ulrich | 714/6 |
| 2002/0174295 A1 | 11/2002 | Ulrich | 709/203 |
| 2002/0174296 A1 | 11/2002 | Ulrich | 711/114 |
| 2002/0178162 A1 | 11/2002 | Ulrich | 711/114 |
| 2002/0191311 A1 | 12/2002 | Ulrich | 707/10 |
| 2002/0194523 A1 | 12/2002 | Ulrich | 360/1 |
| 2002/0194526 A1 | 12/2002 | Ulrich | 714/4 |
| 2003/0220923 A1 | 11/2003 | Curran | 714/6 |
| 2003/0220943 A1 | 11/2003 | Curran | 707/8 |
| 2003/0220974 A1 | 11/2003 | Curran | 707/202 |
| 2003/0221124 A1 | 11/2003 | Curran | 709/205 |
| 2003/0236944 A1 | 12/2003 | Thompson | 713/201 |
| 2004/0153479 A1 | 8/2004 | Mikesell | 711/114 |
| 2004/0177221 A1 | 9/2004 | Bridge | 707/200 |
| 2005/0114350 A1 | 5/2005 | Rose | 711/114 |
| 2006/0248379 A1* | 11/2006 | Jernigan, IV | 714/6 |

OTHER PUBLICATIONS

Gonzales, Jose Luis et al. "Increasing the capacity of RAID5 by online gradual assimilation" In Network Architecture and Parallel I/Os archive, Proceedings of the international workshop on Storage network architecture and parallel I/Os, Antibes Juan-les-Pins, France. pp. 17, 24, Published: 2004 [retrieved on Jun. 30, 2007].

Fibre Channel—Fabric Generic Requirements (FC-FG), American National Standards Institute, Inc., ANSI X3.289-1996, http://www.t11.org/t11/stat.nsf, downloaded Sep. 24, 2007, 37 pages.

Fibre Channel Overview, http://hsi.web.cern.ch/HSI/fcs/spec/overview.htm, downloaded Sep. 24, 2007, 7 pages.

US Office Action for U.S. Appl. No. 11/146,457, mailed on Jul. 11, 2007.

US Final Office Action for U.S. Appl. No. 11/146,457, mailed on Nov. 9, 2007.

Notice of Allowance for U.S. Appl. No. 11/146,457, mailed on Jun. 9, 2008.

EP Supplementary Search Report mailed on Mar. 29, 2010, from related Appl. No. EP 06 77 2380.

EP Office Action mailed on Jul. 26, 2010, from related Appl. No. EP 06 77 2380.

* cited by examiner

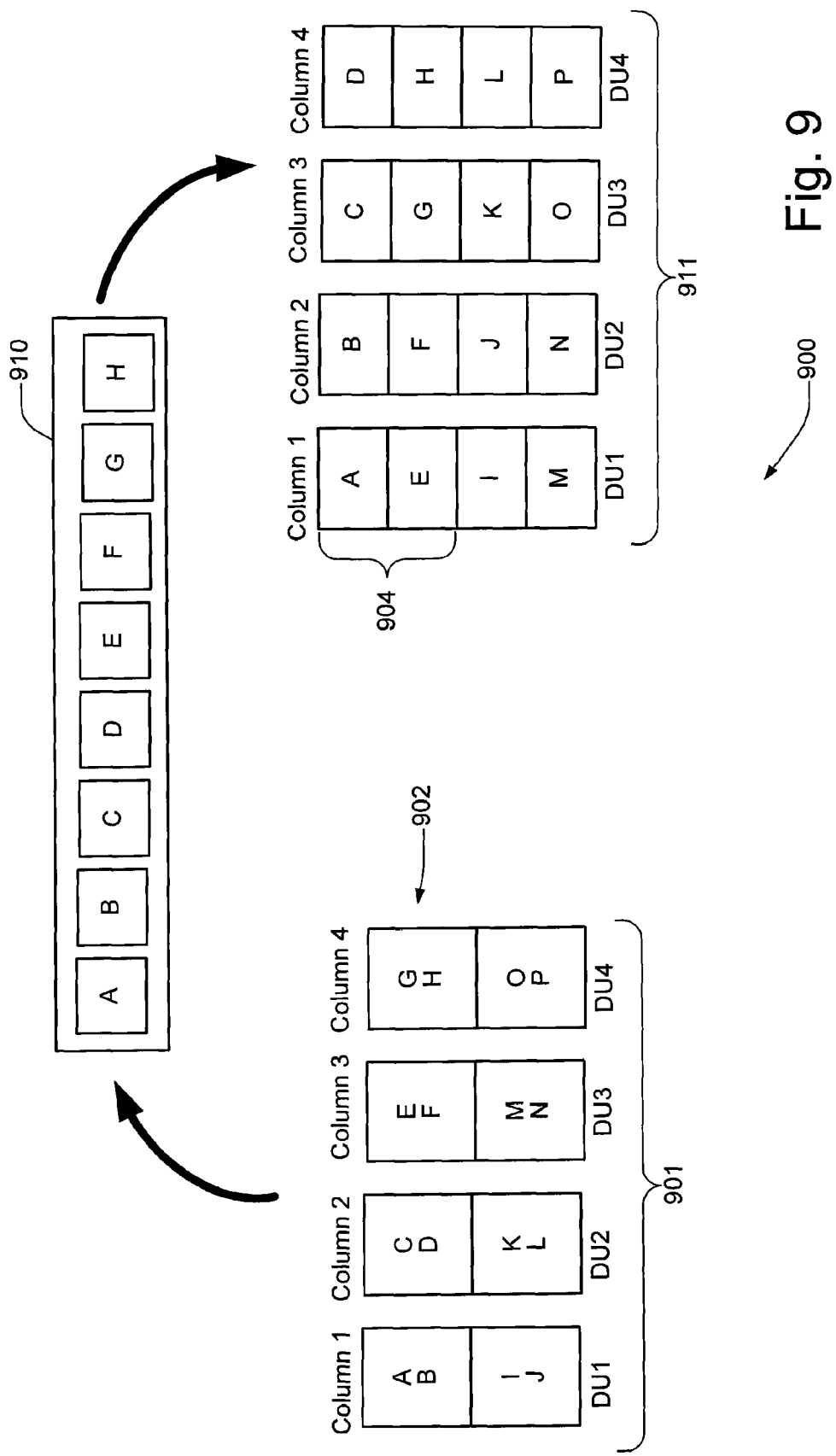

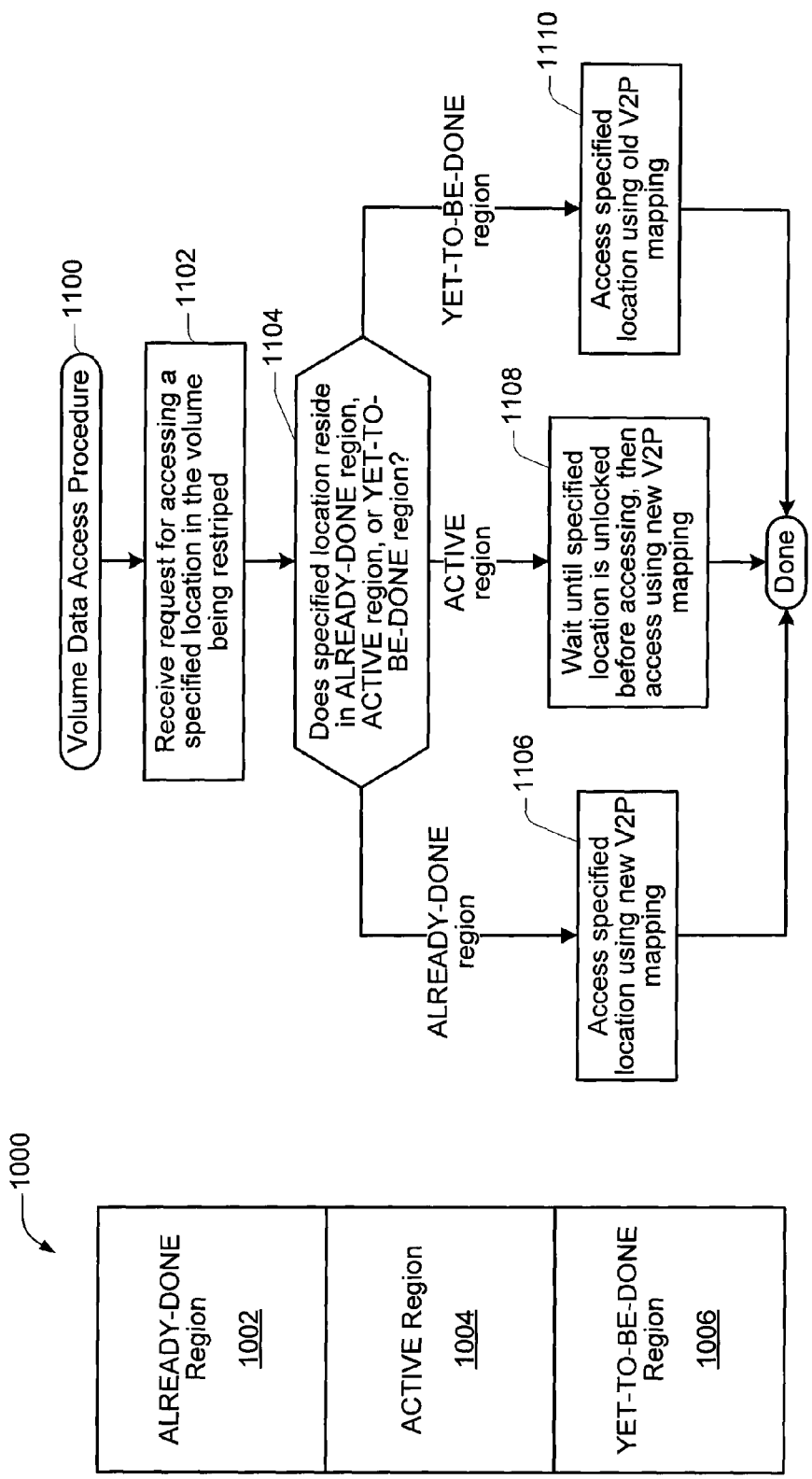

ONLINE RESTRIPING TECHNIQUE FOR DISTRIBUTED NETWORK BASED VIRTUALIZATION

RELATED APPLICATION DATA

This application is a continuation application, pursuant to the provisions of 35 U.S.C. 120, of prior U.S. patent application Ser. No. 11/146,457 entitled, "ONLINE RESTRIPING TECHNIQUE FOR DISTRIBUTED NETWORK BASED VIRTUALIZATION," by Sharma et al., filed on Jun. 6, 2005, the entirety of which is incorporated herein by reference for all purposes.

BACKGROUND OF THE INVENTION

1. Field of the Invention

The present invention relates to network technology. More particularly, the present invention relates to methods and apparatus for implementing online restriping for distributed network based virtualization 2. Description of the Related Art In recent years, the capacity of storage devices has not increased as fast as the demand for storage. Therefore a given server or other host must access multiple, physically distinct storage nodes (typically disks). In order to solve these storage limitations, the storage area network (SAN) was developed. Generally, a storage area network is a high-speed special-purpose network that interconnects different data storage devices and associated data hosts on behalf of a larger network of users. However, although a SAN enables a storage device to be configured for use by various network devices and/or entities within a network, data storage needs are often dynamic rather than static.

FIG. 1 illustrates an exemplary conventional storage area network. More specifically, within a storage area network 102, it is possible to couple a set of hosts (e.g., servers or workstations) 104, 106, 108 to a pool of storage devices (e.g., disks). In SCSI parlance, the hosts may be viewed as "initiators" and the storage devices may be viewed as "targets." A storage pool may be implemented, for example, through a set of storage arrays or disk arrays 110, 112, 114. Each disk array 110, 112, 114 further corresponds to a set of disks. In this example, first disk array 110 corresponds to disks 116, 118, second disk array 112 corresponds to disk 120, and third disk array 114 corresponds to disks 122, 124. Rather than enabling all hosts 104-108 to access all disks 116-124, it is desirable to enable the dynamic and invisible allocation of storage (e.g., disks) to each of the hosts 104-108 via the disk arrays 110, 112, 114. In other words, physical memory (e.g., physical disks) may be allocated through the concept of virtual memory (e.g., virtual disks). This allows one to connect heterogeneous initiators to a distributed, heterogeneous set of targets (storage pool) in a manner enabling the dynamic and transparent allocation of storage.

The concept of virtual memory has traditionally been used to enable physical memory to be virtualized through the translation between physical addresses in physical memory and virtual addresses in virtual memory. Recently, the concept of "virtualization" has been implemented in storage area networks through various mechanisms. Virtualization interconverts physical storage and virtual storage on a storage network. The hosts (initiators) see virtual disks as targets. The virtual disks represent available physical storage in a defined but somewhat flexible manner. Virtualization provides hosts with a representation of available physical storage that is not constrained by certain physical arrangements/allocation of the storage. Some aspects of virtualization have recently been achieved through implementing the virtualization function in various locations within the storage area network. Three such locations have gained some level of acceptance: virtualization in the hosts (e.g., 104-108), virtualization in the disk arrays or storage arrays (e.g., 110-114), and virtualization in the network fabric (e.g., 102).

In some general ways, virtualization on a storage area network is similar to virtual memory on a typical computer system. Virtualization on a network, however, brings far greater complexity and far greater flexibility. The complexity arises directly from the fact that there are a number of separately interconnected network nodes. Virtualization must span these nodes. The nodes include hosts, storage subsystems, and switches (or comparable network traffic control devices such as routers). Often the hosts and/or storage subsystems are heterogeneous, being provided by different vendors. The vendors may employ distinctly different protocols (standard protocols or proprietary protocols). Thus, in many cases, virtualization provides the ability to connect heterogeneous initiators (e.g., hosts or servers) to a distributed, heterogeneous set of targets (storage subsystems), enabling the dynamic and transparent allocation of storage.

Examples of network specific virtualization operations include the following: RAID 0 through RAID 5, concatenation of memory from two or more distinct logical units of physical memory, sparing (auto-replacement of failed physical media), remote mirroring of physical memory, logging information (e.g., errors and/or statistics), load balancing among multiple physical memory systems, striping (e.g., RAID 0), security measures such as access control algorithms for accessing physical memory, resizing of virtual memory blocks, Logical Unit (LUN) mapping to allow arbitrary LUNs to serve as boot devices, backup of physical memory (point in time copying), and the like. These are merely examples of virtualization functions.

Some features of virtualization may be implemented using a Redundant Array of Independent Disks (RAID). Various RAID subtypes are generally known to one having ordinary skill in the art, and include, for example, RAID0, RAID1, RAID0+1, RAID5, etc. In RAID1, a virtual disk may correspond to two physical disks 116, 118 which both store the same data (or otherwise support recovery of the same data), thereby enabling redundancy to be supported within a storage area network. In RAID0, a single virtual disk is striped across multiple physical disks. Some other types of virtualization include concatenation, sparing, etc.

Generally, a striped configuration may be implemented in a storage volume made of n disks in order to distribute the data evenly across the disks in such a way as to maximize the number of drive spindles that are concurrently in use and thus maximize performance. The performance benefits may be realized for both read and write access.

Occasionally, it may be desirable to reconfigure the striping parameters of one or more disk arrays in a storage area network. Such reconfigurations may include, for example, changing the stripe unit size and/or changing the number of columns in the virtualized array. However, conventional techniques for implementing such reconfigurations typically require that the entire disk array be taken off line during the reconfiguration process. This results in service disruptions, which is undesirable. Additionally, conventional restriping techniques typically require the use of additional network resources such as, for example, the use of additional storage devices merely for implementing the restriping operations. For example, one technique commonly used for increasing the number of columns (e.g., from m columns to n columns)

in a virtualized array is to copy the data from the existing array (of m columns) to a new array of physical disks which have been configured as a virtualized array of n columns. However, it can be seen that such a technique will require the use of m+n physical disks, even though the entirety of the data may be stored on n physical disks.

In view of the above, it would be desirable to improve upon restriping techniques implemented in virtualized disk arrays in order, for example, to provide for improved network reliability and efficient utilization of network resources.

SUMMARY OF THE INVENTION

Various aspects of the present invention are directed to different methods, systems, and computer program products for implementing online restriping of a volume in a storage area network. The storage area network includes fibre channel fabric having a plurality of ports. A first instance of the volume is instantiated at a first port of the fibre channel fabric for enabling I/O operations to be performed at the volume. While restriping operations are being performed at the volume, the first port is able to concurrently perform I/O operations at the volume. In at least one implementation, a second instance of the volume may be instantiated at a second port of the fibre channel fabric for enabling I/O operations to be performed at the volume concurrently while at least a portion of the restriping operations are being performed at the volume, and/or concurrently while the first port is performing I/O operations at the volume. According to different embodiments, the restriping operations may include changing a number of columns of the volume, changing a stripe unit size of the volume, etc.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 9 shows a block diagram illustrating how the restriping technique of the present invention may be used for decreasing the stripe unit size of a virtual volume.

FIG. 10 shows a block diagram of a representation of a volume 1000 during restriping operations in accordance with a specific embodiment of the present invention.

FIG. 11 shows a flow diagram of a Volume Data Access Procedure 1100 in accordance with a specific embodiment of the present invention.

DETAILED DESCRIPTION OF THE PREFERRED EMBODIMENTS

Figure 1:
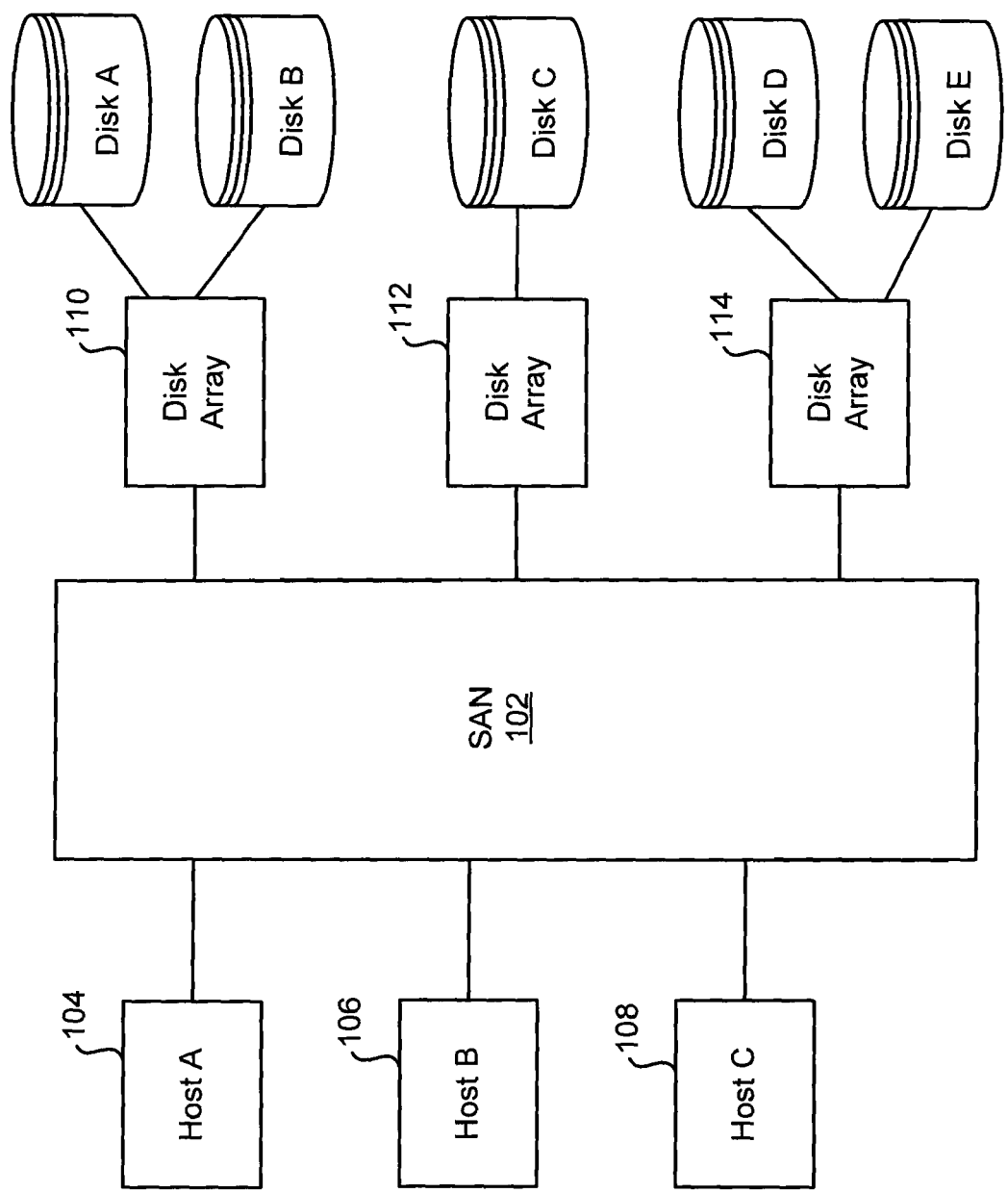
FIG. 1 illustrates an exemplary conventional storage area network.

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

In accordance with various embodiments of the present invention, virtualization of storage within a storage area network may be implemented through the creation of a virtual enclosure having one or more virtual enclosure ports. The virtual enclosure is implemented, in part, by one or more network devices, which will be referred to herein as virtualization switches. More specifically, a virtualization switch, or more specifically, a virtualization port within the virtualization switch, may handle messages such as packets or frames on behalf of one of the virtual enclosure ports. Thus, embodiments of the invention may be applied to a packet or frame directed to a virtual enclosure port, as will be described in further detail below. For convenience, the subsequent discussion will describe embodiments of the invention with respect to frames. Switches act on frames and use information about SANs to make switching decisions.

Note that the frames being received and transmitted by a virtualization switch possess the frame format specified for a standard protocol such as Ethernet or fibre channel. Hence, software and hardware conventionally used to generate such frames may be employed with this invention. Additional hardware and/or software is employed to modify and/or generate frames compatible with the standard protocol in accordance with this invention. Those of skill in the art will understand how to develop the necessary hardware and software to allow virtualization as described below.

Obviously, the appropriate network devices should be configured with the appropriate software and/or hardware for performing virtualization functionality. Of course, all network devices within the storage area network need not be configured with the virtualization functionality. Rather, selected switches and/or ports may be configured with or adapted for virtualization functionality. Similarly, in various embodiments, such virtualization functionality may be enabled or disabled through the selection of various modes. Moreover, it may be desirable to configure selected ports of network devices as virtualization-capable ports capable of performing virtualization, either continuously, or only when in a virtualization enabled state.

The standard protocol employed in the storage area network (i.e., the protocol used to frame the data) will typically, although not necessarily, be synonymous with the "type of traffic" carried by the network. As explained below, the type of traffic is defined in some encapsulation formats. Examples of the type of traffic are typically layer 2 or corresponding layer formats such as Ethernet, Fibre channel, and InfiniBand.

As described above, a storage area network (SAN) is a high-speed special-purpose network that interconnects different data storage devices with associated network hosts (e.g., data servers or end user machines) on behalf of a larger network of users. A SAN is defined by the physical configuration of the system. In other words, those devices in a SAN must be physically interconnected.

It will be appreciated that various aspects of the present invention pertain to virtualized storage networks. Unlike prior methods in which virtualization is implemented at the hosts or disk arrays, virtualization in this invention is implemented through the creation and implementation of a virtual enclosure. This is accomplished, in part, through the use of switches or other "interior" network nodes of a storage area network to implement the virtual enclosure. Further, the virtualization of this invention typically is implemented on a per port basis. In other words, a multi-port virtualization switch will have virtualization separately implemented on one or more of its ports. Individual ports have dedicated logic for handing the virtualization functions for packets or frames handled by the individual ports, which may be referred to as "intelligent" ports or simply "iPorts." This allows virtualization processing to scale with the number of ports, and provides far greater bandwidth for virtualization than can be provided with host based or storage based virtualization schemes. In such prior art approaches the number of connections between hosts and the network fabric or between storage nodes and the network fabric are limited—at least in comparison to the number of ports in the network fabric.

Virtualization may take many forms. In general, it may be defined as logic or procedures that inter-relate physical storage and virtual storage on a storage network. Hosts see a representation of available physical storage that is not constrained by the physical arrangements or allocations inherent in that storage. One example of a physical constraint that is transcended by virtualization includes the size and location of constituent physical storage blocks. For example, logical units as defined by the Small Computer System Interface (SCSI) standards come in precise physical sizes (e.g., 36 GB and 72 GB). Virtualization can represent storage in virtual logical units that are smaller or larger than the defined size of a physical logical unit. Further, virtualization can present a virtual logical unit comprised of regions from two or more different physical logical units, sometimes provided on devices from different vendors. Preferably, the virtualization operations are transparent to at least some network entities (e.g., hosts).

In some of the discussion herein, the functions of virtualization switches of this invention are described in terms of the SCSI protocol. This is because many storage area networks in commerce run a SCSI protocol to access storage sites. Frequently, the storage area network employs fibre channel (e.g., FC-PH (ANSI X3.230-1994), Fibre channel—Physical and Signaling Interface) as a lower level protocol and runs IP and SCSI on top of fibre channel. Note that the invention is not limited to any of these protocols. For example, fibre channel may be replaced with Ethernet, Infiniband, and the like. Further the higher level protocols need not include SCSI. For example, this may include SCSI over FC, iSCSI (SCSI over IP), parallel SCSI (SCSI over a parallel cable), serial SCSI (SCSI over serial cable, and all the other incarnations of SCSI.

Because SCSI is so widely used in storage area networks, much of the terminology used herein will be SCSI terminology. The use of SCSI terminology (e.g., "initiator" and "target") does not imply that the describe procedure or apparatus must employ SCSI. Before going further, it is worth explaining a few of the SCSI terms that will be used in this discussion. First an "initiator" is a device (usually a host system) that requests an operation to be performed by another device. Typically, in the context of this document, a host initiator will request a read or write operation be performed on a region of virtual or physical memory. Next, a "target" is a device that performs an operation requested by an initiator. For example, a target physical memory disk will obtain or write data as initially requested by a host initiator. Note that while the host initiator may provide instructions to read from or write to a "virtual" target having a virtual address, a virtualization switch of this invention must first convert those instructions to a physical target address before instructing the target.

Targets may be divided into physical or virtual "logical units." These are specific devices addressable through the target. For example, a physical storage subsystem may be organized in a number of distinct logical units. In this document, hosts view virtual memory as distinct virtual logical units. Sometimes herein, logical units will be referred to as "LUNs." In the SCSI standard, LUN refers to a logical unit number. But in common parlance, LUN also refers to the logical unit itself.

Central to virtualization is the concept of a "virtualization model." This is the way in which physical storage provided on storage subsystems (such as disk arrays) is related to a virtual storage seen by hosts or other initiators on a network. While the relationship may take many forms and be characterized by various terms, a SCSI-based terminology will be used, as indicated above. Thus, the physical side of the storage area network will be described as a physical LUN. The host side, in turn, sees one or more virtual LUNs, which are virtual representations of the physical LUNs. The mapping of physical LUNs to virtual LUNs may logically take place over one, two, or more levels. In the end, there is a mapping function that can be used by switches of this invention to interconvert between physical LUN addresses and virtual LUN addresses.

Figure 2:
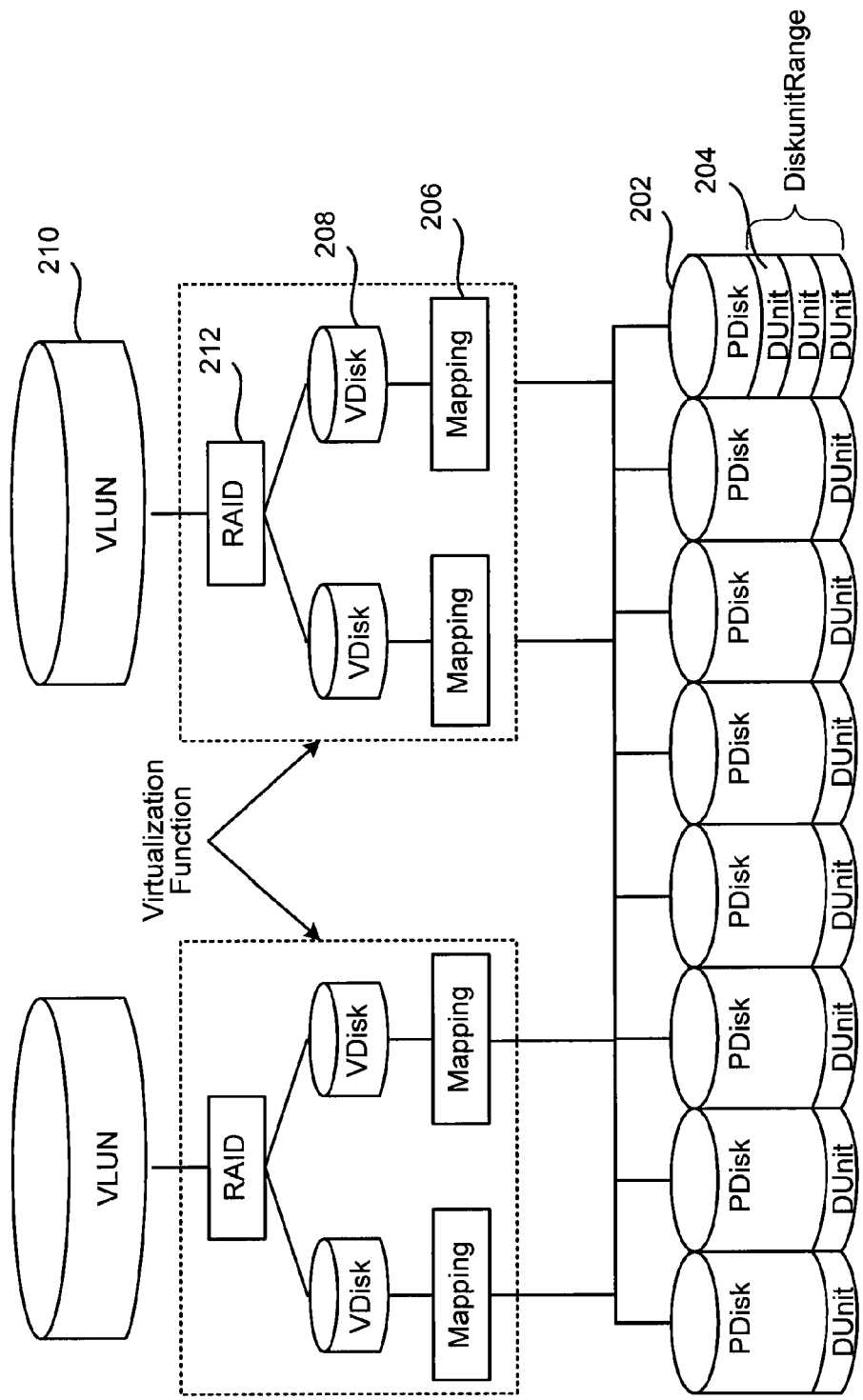
FIG. 2 is a block diagram illustrating an example of a virtualization model that may be implemented within a storage area network in accordance with various embodiments of the invention.

FIG. 2 is a block diagram illustrating an example of a virtualization model that may be implemented within a storage area network in accordance with various embodiments of the invention. As shown, the physical storage of the storage area network is made up of one or more physical LUNs, shown here as physical disks 202. Each physical LUN is a device that is capable of containing data stored in one or more contiguous blocks which are individually and directly accessible. For instance, each block of memory within a physical LUN may be represented as a block 204, which may be referred to as a disk unit (DUnit).

Through a mapping function 206, it is possible to convert physical LUN addresses associated with physical LUNs 202 to virtual LUN addresses, and vice versa. More specifically, as described above, the virtualization and therefore the mapping function may take place over one or more levels. For instance, as shown, at a first virtualization level, one or more virtual LUNs 208 each represents one or more physical LUNs 202, or portions thereof. The physical LUNs 202 that together make up a single virtual LUN 208 need not be contiguous. Similarly, the physical LUNs 202 that are mapped to a virtual LUN 208 need not be located within a single target. Thus, through virtualization, virtual LUNs 208 may be created that represent physical memory located in physically distinct targets, which may be from different vendors, and therefore may support different protocols and types of traffic.

Although the virtualization model may be implemented with a single level, a hierarchical arrangement of any number of levels may be supported by various embodiments of the present invention. For instance, as shown, a second virtualization level within the virtualization model of FIG. 2 is referred to as a high-level VLUN or volume 210. Typically, the initiator device "sees" only VLUN 210 when accessing data. In accordance with various embodiments of the invention, multiple VLUNs are "enclosed" within a virtual enclosure such that only the virtual enclosure may be "seen" by the initiator. In other words, the VLUNs enclosed by the virtual enclosure are not visible to the initiator.

In this example, VLUN 210 is implemented as a "logical" RAID array of virtual LUNs 208. Moreover, such a virtualization level may be further implemented, such as through the use of striping and/or mirroring. In addition, it is important to note that it is unnecessary to specify the number of virtualization levels to support the mapping function 206. Rather, an arbitrary number of levels of virtualization may be supported, for example, through a recursive mapping function. For instance, various levels of nodes may be built and maintained in a tree data structure, linked list, or other suitable data structure that can be traversed.

Each initiator may therefore access physical LUNs via nodes located at any of the levels of the hierarchical virtualization model. Nodes within a given virtualization level of the hierarchical model implemented within a given storage area network may be both visible to and accessible to an allowed set of initiators (not shown). However, in accordance with various embodiments of the invention, these nodes are enclosed in a virtual enclosure, and are therefore no longer visible to the allowed set of initiators. Nodes within a particular virtualization level (e.g., VLUNs) need to be created before functions (e.g., read, write) may be operated upon them. This may be accomplished, for example, through a master boot record of a particular initiator. In addition, various initiators may be assigned read and/or write privileges with respect to particular nodes (e.g., VLUNs) within a particular virtualization level. In this manner, a node within a particular virtualization level may be accessible by selected initiators.

As described above, various switches within a storage area network may be virtualization switches supporting virtualization functionality.

Figure 3A:
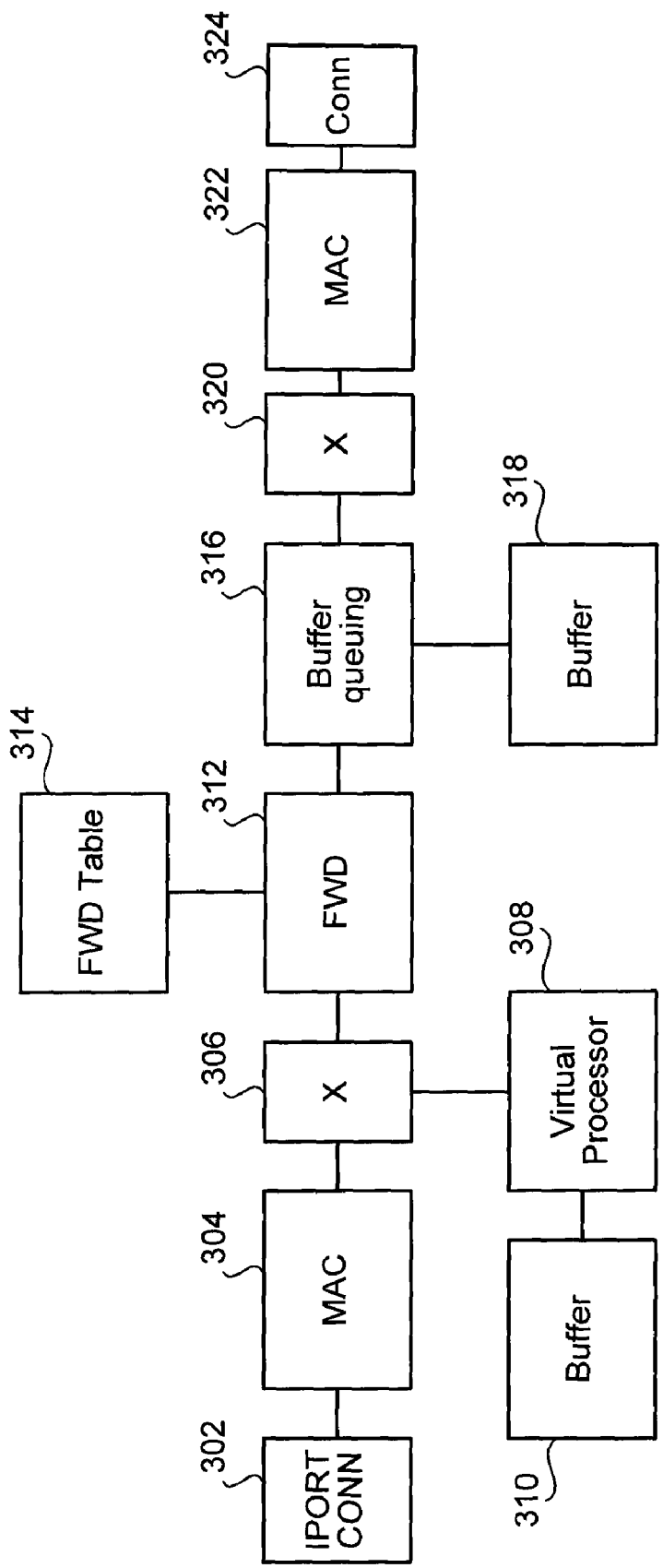
FIGS. 3A-C are block diagrams illustrating exemplary virtualization switches or portions thereof in which various embodiments of the present invention may be implemented.

FIG. 3A is a block diagram illustrating an exemplary virtualization switch in which various embodiments of the present invention may be implemented. As shown, data or messages are received by an intelligent, virtualization port (also referred to as an iPort) via a bi-directional connector 302. In addition, the virtualization port is adapted for handling messages on behalf of a virtual enclosure port, as will be described in further detail below. In association with the incoming port, Media Access Control (MAC) block 304 is provided, which enables frames of various protocols such as Ethernet or fibre channel to be received. In addition, a virtualization intercept switch 306 determines whether an address specified in an incoming frame pertains to access of a virtual storage location of a virtual storage unit representing one or more physical storage locations on one or more physical storage units of the storage area network. For instance, the virtual storage unit may be a virtual storage unit (e.g., VLUN) that is enclosed within a virtual enclosure.

When the virtualization intercept switch 306 determines that the address specified in an incoming frame pertains to access of a virtual storage location rather than a physical storage location, the frame is processed by a virtualization processor 308 capable of performing a mapping function such as that described above. More particularly, the virtualization processor 308 obtains a virtual-physical mapping between the one or more physical storage locations and the virtual storage location. In this manner, the virtualization processor 308 may look up either a physical or virtual address, as appropriate. For instance, it may be necessary to perform a mapping from a physical address to a virtual address or, alternatively, from a virtual address to one or more physical addresses.

Once the virtual-physical mapping is obtained, the virtualization processor 308 may then employ the obtained mapping to either generate a new frame or modify the existing frame, thereby enabling the frame to be sent to an initiator or a target specified by the virtual-physical mapping. The mapping function may also specify that the frame needs to be replicated multiple times, such as in the case of a mirrored write. More particularly, the source address and/or destination addresses are modified as appropriate. For instance, for data from the target, the virtualization processor replaces the source address, which was originally the physical LUN address with the corresponding virtual LUN and address. In the destination address, the port replaces its own address with that of the initiator. For data from the initiator, the port changes the source address from the initiator's address to the port's own address. It also changes the destination address from the virtual LUN/address to the corresponding physical LUN/address. The new or modified frame may then be provided to the virtualization intercept switch 306 to enable the frame to be sent to its intended destination.

While the virtualization processor 308 obtains and applies the virtual-physical mapping, the frame or associated data may be stored in a temporary memory location (e.g., buffer) 310. In addition, it may be necessary or desirable to store data that is being transmitted or received until it has been confirmed that the desired read or write operation has been successfully completed. As one example, it may be desirable to write a large amount of data to a virtual LUN, which must be transmitted separately in multiple frames. It may therefore be desirable to temporarily buffer the data until confirmation of receipt of the data is received. As another example, it may be desirable to read a large amount of data from a virtual LUN, which may be received separately in multiple frames. Furthermore, this data may be received in an order that is inconsistent with the order in which the data should be transmitted to the initiator of the read command. In this instance, it may be beneficial to buffer the data prior to transmitting the data to the initiator to enable the data to be re-ordered prior to transmission. Similarly, it may be desirable to buffer the data in the event that it is becomes necessary to verify the integrity of the data that has been sent to an initiator (or target).

The new or modified frame is then received by a forwarding engine 312, which obtains information from various fields of the frame, such as source address and destination address. The forwarding engine 312 then accesses a forwarding table 314 to determine whether the source address has access to the specified destination address. More specifically, the forwarding table 314 may include physical LUN addresses as well as virtual LUN addresses. The forwarding engine 312 also determines the appropriate port of the switch via which to send the frame, and generates an appropriate routing tag for the frame.

Once the frame is appropriately formatted for transmission, the frame will be received by a buffer queuing block 316 prior to transmission. Rather than transmitting frames as they are received, it may be desirable to temporarily store the frame in a buffer or queue 318. For instance, it may be desirable to temporarily store a packet based upon Quality of Service in one of a set of queues that each correspond to different priority levels. The frame is then transmitted via switch fabric 320 to the appropriate port. As shown, the outgoing port has its own MAC block 322 and bi-directional connector 324 via which the frame may be transmitted.

Figure 3B:
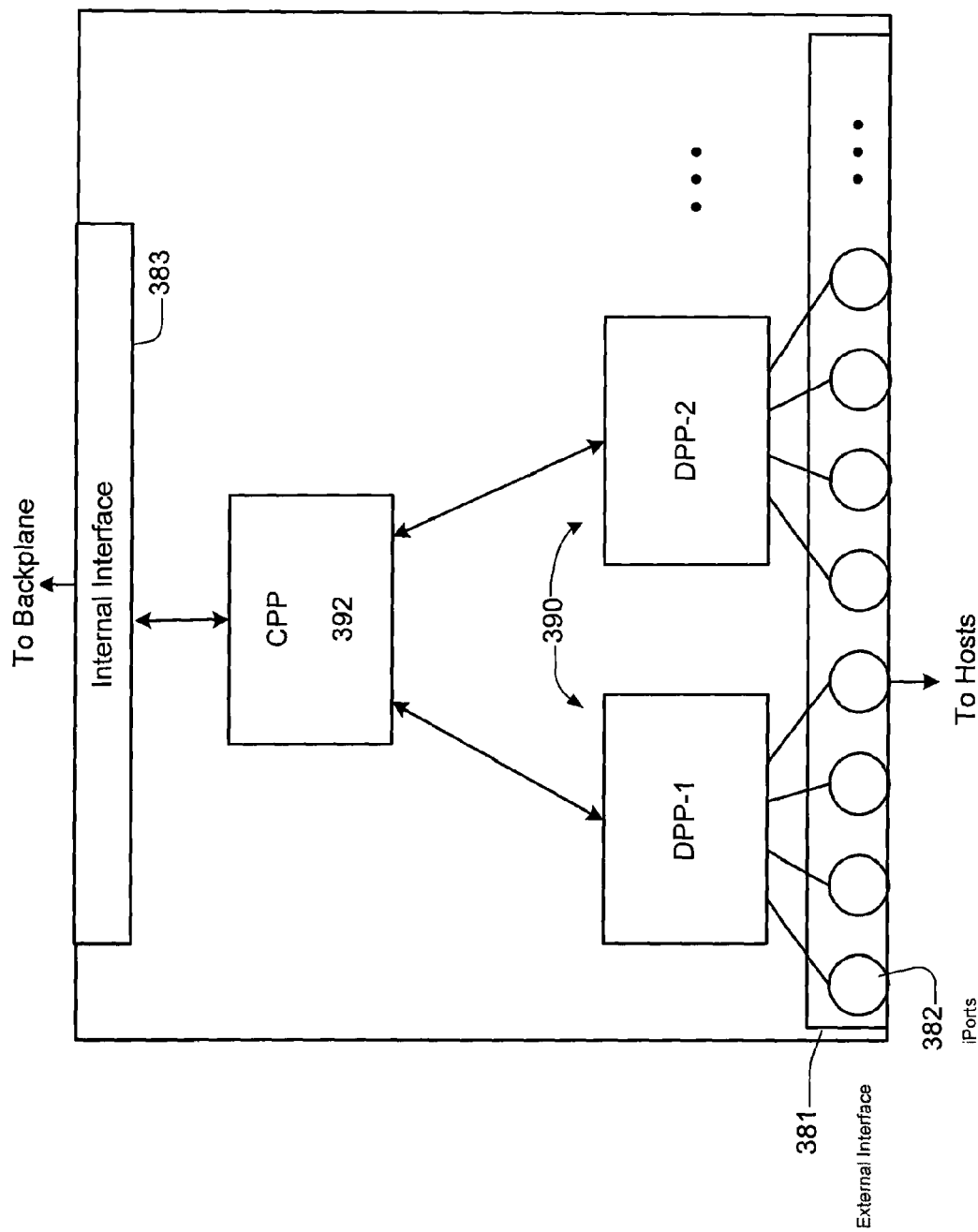

FIG. 3B is a block diagram illustrating a portion of an exemplary virtualization switch or intelligent line card in which various embodiments of the present invention may be implemented. According to a specific embodiment, switch portion 380 of FIG. 3B may be implemented as one of a plurality of line cards residing in a fibre channel switch such as that illustrated in FIG. 13, for example. In at least one implementation, switch portion 380 may include a plurality of different components such as, for example, at least one external interface 381, at least one data path processor (DPP) 390, at least one control path processor (CPP) 392, at least one internal interface 383, etc.

As shown in the example of FIG. 3B the external interface of 381 may include a plurality of ports 382 configured or designed to communicate with external devices such as, for example, host devices, storage devices, etc. One or more groups of ports may be managed by a respective data path processor (DPP) unit. According to a specific implementation the data path processor may be configured or designed as a general-purpose microprocessor used to terminate the SCSI protocol and to emulate N_Port/NL_Port functionality. It may also be configured to implement RAID functions for the intelligent port(s) such as, for example, striping and mirroring. In one embodiment, the DPP may be configured or designed to perform volume configuration lookup, virtual to physical translation on the volume address space, exchange state maintenance, scheduling of frame transmission, and/or other functions. In at least some embodiments, the ports 382 may be referred to as "intelligent" ports or "iPorts" because of the "intelligent" functionality provided by the managing DPPs. Additionally, in at least some embodiments, the term iPort and DPP may be used interchangeably when referring to such "intelligent" functionality. In a specific embodiment of the invention, the virtualization logic may be separately implemented at individual ports of a given switch. This allows the virtualization processing capacity to be closely matched with the exact needs of the switch (and the virtual enclosure) on a per port basis. For example, if a request is received at a given port for accessing a virtual LUN address location in the virtual volume, the DPP may be configured or designed to perform the necessary mapping calculations in order to determine the physical disk location corresponding to the virtual LUN address.

As illustrated in FIG. 3B, switch portion 380 may also include a control path processor (CPP) 392 configured or designed to perform control path processing for storage virtualization. In at least one implementation, functions performed by the control path processor may include, for example, calculating or generating virtual-to-physical (V2P) mappings, processing of port login and process login for volumes; hosting iPort VM clients which communicate with volume management (VM) server(s) to get information about the volumes; communicating with name server(s); etc.

Figure 3C:
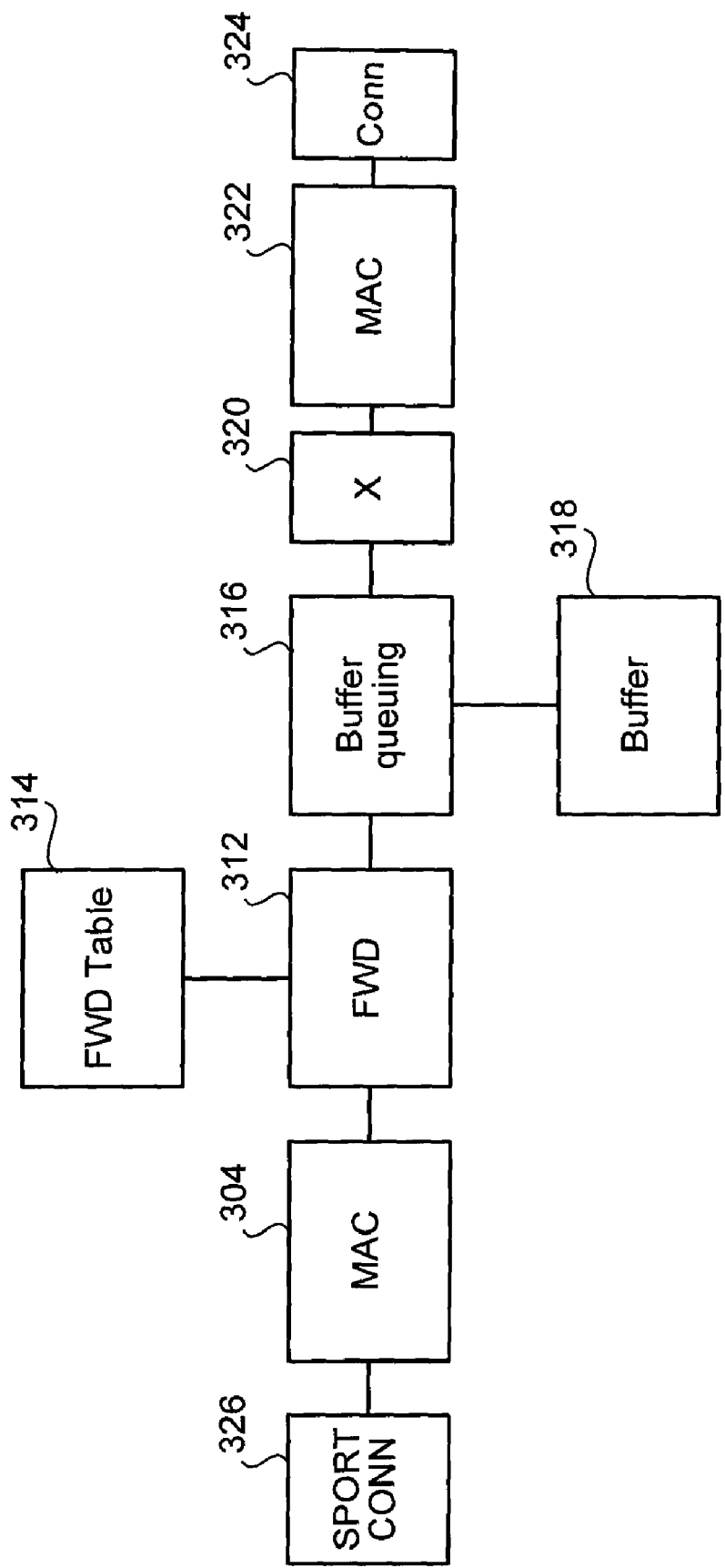

As described above, all switches in a storage area network need not be virtualization switches. In other words, a switch may be a standard switch in which none of the ports implement "intelligent," virtualization functionality. FIG. 3C is a block diagram illustrating an exemplary standard switch in which various embodiments of the present invention may be implemented. As shown, a standard port 326 has a MAC block 304. However, a virtualization intercept switch and virtualization processor such as those illustrated in FIG. 3A are not implemented. A frame that is received at the incoming port is merely processed by the forwarding engine 312 and its associated forwarding table 314. Prior to transmission, a frame may be queued 316 in a buffer or queue 318. Frames are then forwarded via switch fabric 320 to an outgoing port. As shown, the outgoing port also has an associated MAC block 322 and bi-directional connector 324. Of course, each port may support a variety of protocols. For instance, the outgoing port may be an iSCSI port (i.e. a port that supports SCSI over IP over Ethernet), which also supports virtualization, as well as parallel SCSI and serial SCSI.

Although the network devices described above with reference to FIG. 3A-C are described as switches, these network devices are merely illustrative. Thus, other network devices such as routers may be implemented to receive, process, modify and/or generate packets or frames with functionality such as that described above for transmission in a storage area network. Moreover, the above-described network devices are merely illustrative, and therefore other types of network devices may be implemented to perform the disclosed virtualization functionality.

In at least one embodiment, a storage area network may be implemented with virtualization switches adapted for implementing virtualization functionality as well as standard switches. Each virtualization switch may include one or more "intelligent" virtualization ports as well as one or more standard ports. In order to support the virtual-physical mapping and accessibility of memory by multiple applications and/or hosts, it is desirable to coordinate memory accesses between the virtualization switches in the fabric. In one implementation, communication between switches may be accomplished by an inter-switch link.

Figure 12:
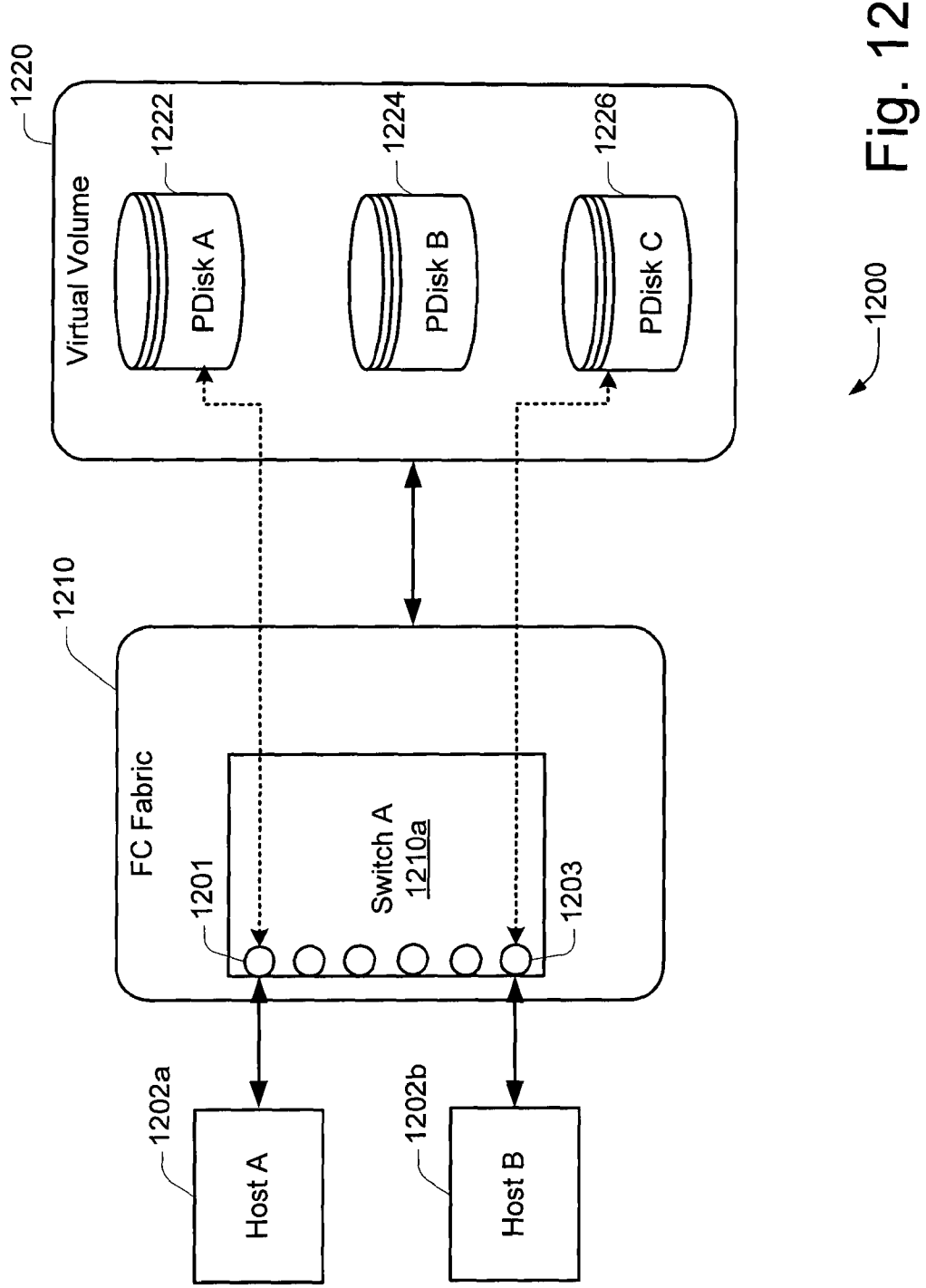
FIG. 12 shows a block diagram of a network portion 1200 illustrating a specific embodiment of how virtualization may be implemented in a storage area network.

FIG. 12 shows a block diagram of a network portion 1200 illustrating a specific embodiment of how virtualization may be implemented in a storage area network. As illustrated in the example of FIG. 12, the FC fabric 1210 has been configured to implement a virtual volume 1220 using an array of three physical disks (PDisks) (1222, 1224, 1226). Typically, SCSI targets are directly accessible by SCSI initiators (e.g., hosts). In other words, SCSI targets such as PLUNs are visible to the hosts that are accessing those SCSI targets. Similarly, even when VLUNs are implemented, the VLUNs are visible and accessible to the SCSI initiators. Thus, each host must typically identify those VLUNs that are available to it. More specifically, the host typically determines which SCSI target ports are available to it. The host may then ask each of those SCSI target ports which VLUNs are available via those SCSI target ports.

In the example of FIG. 12, it is assumed that Host A 1202*a* uses port 1201 to access a location in the virtual volume which corresponds to a physical location at PDisk A. Additionally, it is assumed that Host B 1202*b* uses port 1203 to access a location in the virtual volume which corresponds to a physical location at PDisk C. Accordingly, in this embodiment, port 1201 provides a first instantiation of the virtual volume 1220 to Host A, and port 1203 provides a second instantiation of the virtual volume 1220 to Host B. In network based virtualization, it is desirable that the volume remains online even in presence of multiple instances of the volume.

As explained in greater detail below, if it is desired to perform online restriping of the virtual volume 1220, it is preferable that the restripe engine and the iPorts be synchronized while accessing user data in the virtual volume. Such synchronization is typically not provided by conventional restriping techniques. Without such synchronization, the possibility of data corruption is increased. Such data corruption may occur, for example, when the restripe engine is in the process of copying a portion of user data that is concurrently being written by the user (e.g., host).

According to specific embodiments of the present invention, online restriping may include the operations of changing the stripe unit size of an online volume and/or changing the number of columns of the volume. In at least one embodiment, the term "online" implies that the application is able to access (read/write) the volume during the process of restriping.

According to lease one embodiment of the present convention, it is preferable to perform online restriping using minimal extra storage while performing minimal operations. As described in greater detail below, a variety of different exemplary online restriping scenarios are presented for the purpose of illustrating various aspects of the present invention. These different scenarios include, for example: (1) changing the number of columns in a virtual volume from n to m, where m>n; (2) changing the number of columns in a virtual volume from n to m, where m<n; (3) increasing the stripe unit size of a virtual volume; and (4) decreasing the stripe unit size of a virtual volume.

Changing The Number of Columns During Online Restriping

Figure 4:
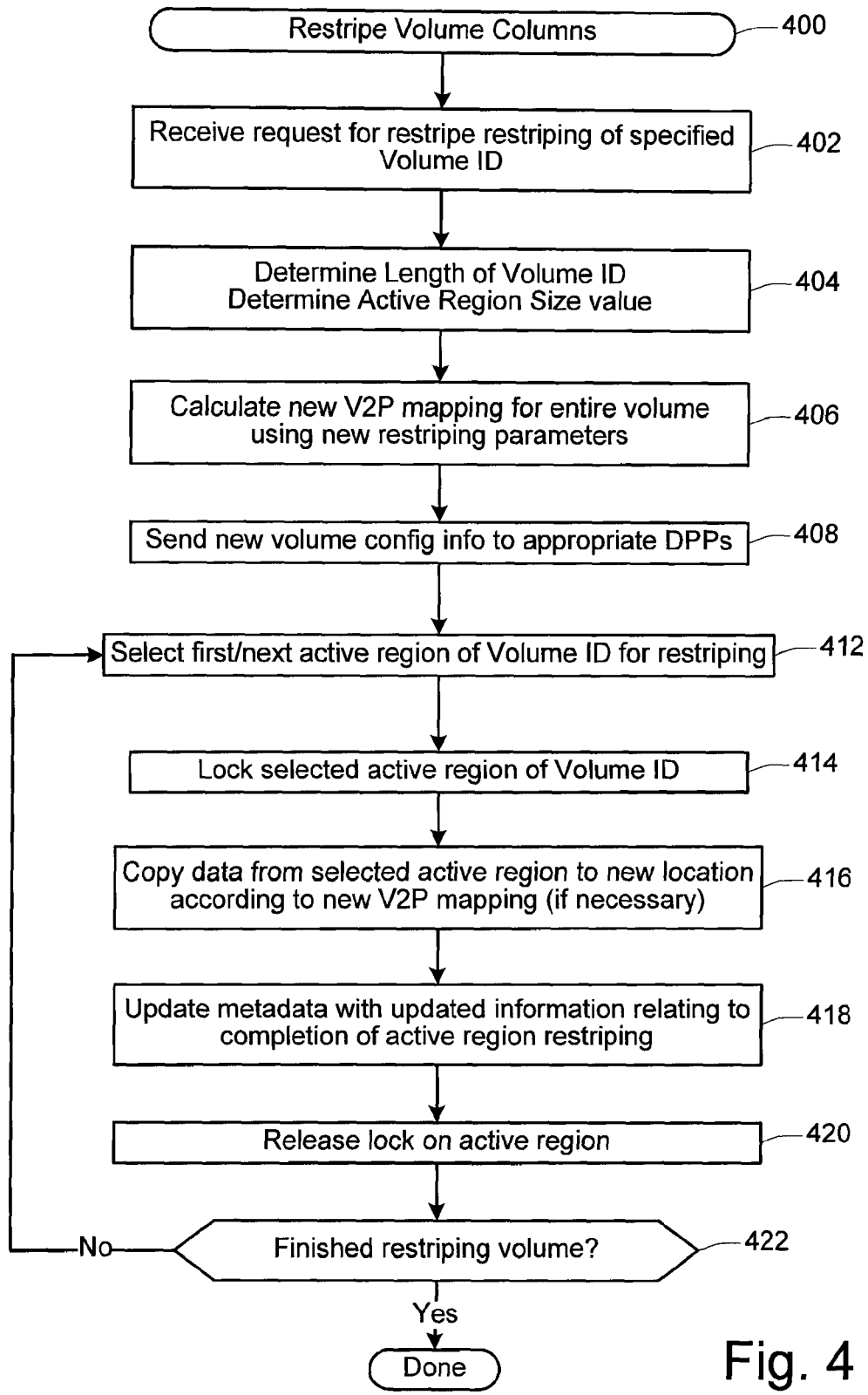
FIG. 4 shows a flow diagram of a Restripe Volume Columns Procedure 400 in accordance with a specific embodiment of the present invention.

FIG. 4 shows a flow diagram of a Restripe Volume Columns Procedure 400 in accordance with a specific embodiment of the present invention. In at least one implementation, the Restripe Volume Columns Procedure may be implemented either automatically or manually, such as, for example, at the request of a network administrator. In at least one implementation, aspects of the Restripe Volume Columns Procedure may be implemented at the fabric portion of the storage area network. For example, in one implementation, the Volume Management (VM) may instantiate a restripe engine on a selected iPort servicing a volume to be restriped. In case of multiple iPorts servicing the volume, the VM may choose an iPort to perform the restriping operations. According to different embodiments, the VM may reside on an external appliance, or may reside on a line card such as an ILC (intelligent line-card). The VM may be configured or designed to control and configure the volume management tasks (such as, for example, creating a volume, restriping a volume, etc).

Initially, as illustrated at 402, a request is received for restriping a specified volume of the network storage. In at least one implementation, the request may include a variety of parameters such as, for example, a volume ID parameters which may be used for identifying a particular volume for restriping, a restripe type parameter specifying a type of restriping operation to be performed (e.g., change number of columns, change stripe unit size, etc.); a value parameter specifying a value to be used for the restriping operation (e.g., new number of columns, new stripe unit size, etc.); etc. For purposes of illustration, it is assumed that the restripe request corresponds to a request for increasing the number of columns of virtual volume 601 (FIG. 6) from three columns to four columns.

Figure 6:
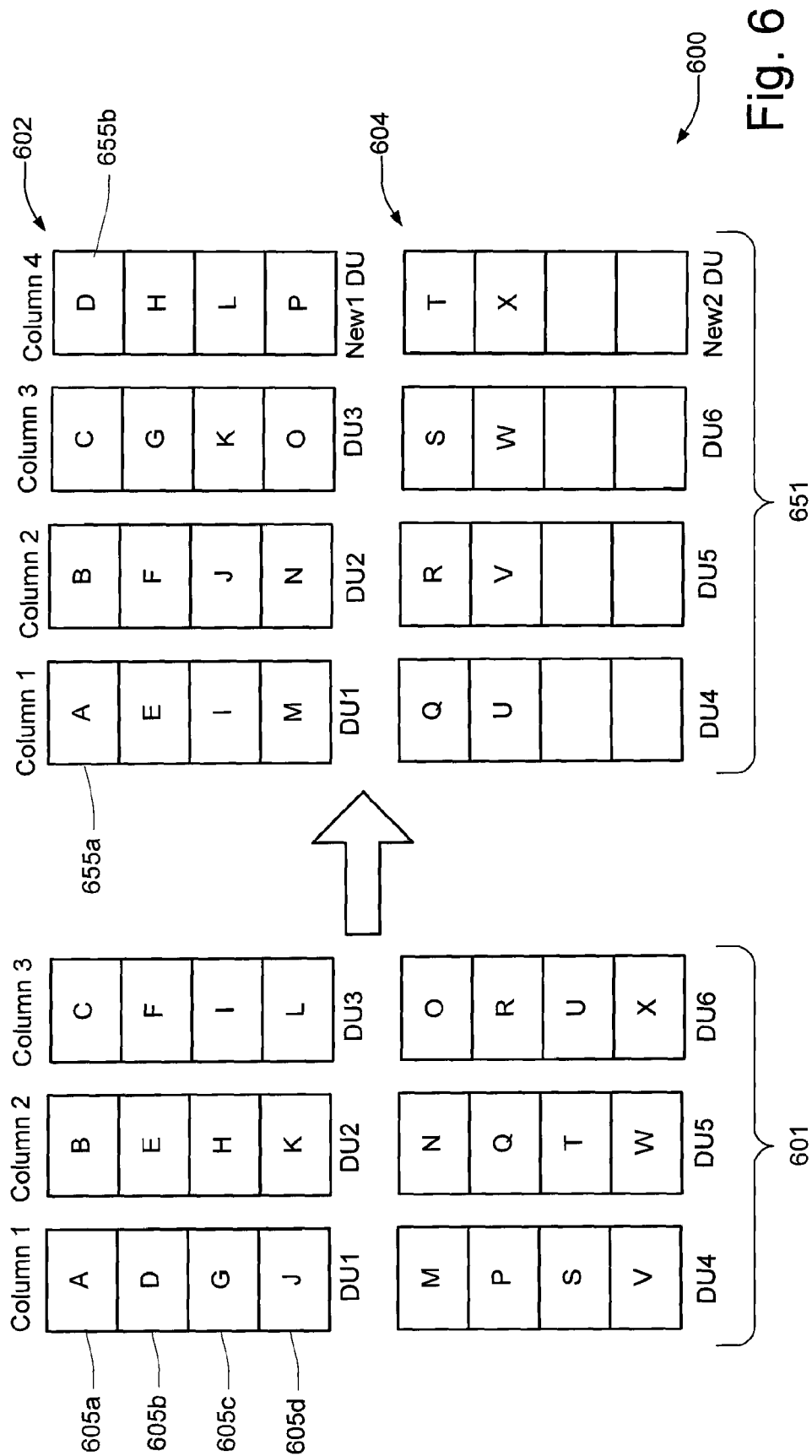
FIG. 6 shows a block diagram illustrating how the restriping technique of the present invention may be used for increasing the number of columns in a virtual volume.

FIG. 6 shows a block diagram illustrating how the restriping technique of the present invention may be used for increasing the number of columns in a virtual volume. Initially, as illustrated in FIG. 6, the virtual volume 601 is comprised of six physical Diskunits (PDisk) DU1-DU6 which have been mapped into three columns, namely columns 1-3. Each diskunit in the volume 601 of FIG. 6 includes four respective stripe units (e.g., 605a-d) in which data is stored (e.g., the data being characterized by letters A-X).

Returning to FIG. 4, using at least a portion of the information specified in the received restripe request, the length of the volume (corresponding to the specified volume ID) is determined (404). Additionally, an active region size (ARS) value is also determined. In at least one embodiment, the active region corresponds to the working or active region of the specified volume for which restriping operations are currently being implemented. In at least one implementation, it is desirable to set the active region size value equal to the stripe unit size value of the volume which is being restriped. Additionally, in at least one implementation, the active region size value should be at least large enough to take advantage of the disk spindle movement overhead. Examples of preferred active region size values are 64 kilobytes, and 128 kilobytes. In at least one implementation, the active region size value maybe preconfigured by a system operator or administrator. The preconfigured value may be manually selected by the system operator or, alternatively, may be automatically selected to be equal to the stripe unit size value of the identified volume.

Once the specific restriping parameters have been determined, a new virtual-to-physical (V2P) mapping of the entire identified volume may be calculated (406) using the new restriping parameters. According to a specific implementation where the Restripe Volume Columns Procedure is being implemented at a switch or port in the FC fabric, the new V2P mapping calculations may be performed by at least one control path processor (CPP) such as, for example, CPP 392 of FIG. 3B. In at least one implementation the V2P mapping may be implemented as an algorithm-based mapping or, alternatively, as a table-based mapping. A lookup of the new V2P mapping provides V2P mapping information according to the new layout of the volume.

The updated volume configuration information, which may include the new V2P mapping information, may be sent (408) to appropriate iPorts and/or display path processors (DPPs) such as, for example, DPPs 390 of FIG. 3B. In at least one implementation, the DPPs may be configured or designed to monitor the progress of the volume restriping operations, and to use such information to perform appropriate actions for ensuring that valid data is accessed to/from the specified volume during restriping operations. In at least one implementation, it is preferable to provide the new V2P mapping information to all iPorts servicing the identified volume.

As shown at 412, a first active region of the identified volume may be selected for restriping. According to one implementation, where the restriping operation corresponds to an increase in the number of columns of the virtual volume, the restriping operations (e.g., selection of the active region for restriping) may commence starting from the beginning of the identified volume. In a different embodiment where the number of columns of a particular virtual volume is to be decreased, the restriping operations may commence starting from the end of the identified volume.

In the current example, as illustrated in FIG. 6, it is assumed that the number of columns be increased from three columns to four columns. Accordingly, in at least one implementation, the first active region which is selected for restriping the volume 601 of FIG. 6 is that corresponding to stripe unit 605a of Diskunit DU1.

In order to minimize the possibility of data corruption during the online restriping operation, the selected active region of the volume may be temporarily locked (414) during the restriping operations. In at least one implementation, the locking of a selected region in the virtual volume includes denying read/write access to the selected region. According to a specific embodiment, the restripe engine may be configured or designed to send a lock request to selected iPorts servicing the identified volume (which is being restriped). In one implementation, the lock request may include the start address and the end address of the region being locked (e.g., the active region). The lock request may also include the ID of the requestor iPort or application. The locking of the selected active region may also help facilitate synchronization between the restripe engine and the iPorts. In one embodiment, a selected iPort may be designated to arbitrate the lock requests. This iPort may be referred to as the MiP, and may be configured or designed to manage the lock/unlock infrastructure for the selected active region. In an alternate implementation, the locking functionality may be distributed across multiple iports of the FC fabric. In this latter implementation, individual iports may be provided with functionality for independently locking/unlocking desired regions of the volume being restriped. Additionally, the iports may be provided with functionality for broadcasting their locked/unlocked region information to other ports or devices in the FC fabric.

As shown at 416, the data stored at the selected active region may be copied and/or moved (if necessary) to a new location in the virtual volume in accordance with the new V2P mapping. For example, if the selected active region corresponds to stripe unit 605a, no change need be performed since the new V2P mapping for this selected active region remains the same as the old V2P mapping. However, if the selected active region corresponds to stripe unit 605b, then the data from stripe unit 605b is moved to a new stripe unit location (e.g., 655b) in accordance with the new V2P mapping parameters.

After completion of the restriping operation for the currently selected active region, metadata relating to the identified volume may be updated (418) to reflect the completion of restriping for the currently selected active region. In at least one embodiment, it is preferable that the restripe engine and the iPorts have a consistent view of the metadata associated with the value being restriped. For example, if multiple iPorts are modifying metadata, it is preferable that the metadata be kept consistent. In order to achieve this, the metadata may be managed by a central entity (e.g., MiP) for each volume. Any updates or reads to the metadata go through this central entity (MiP). When the restripe engine needs access to the metadata, it consults the MiP. According to a specific implementation, the metadata may be stored in stable, persistent storage.

As shown at 420, once the restriping operation for the selected active region has been completed the selected active region may then be unlocked (420), thereby allowing read/write access to that region. In at least one implementation, subsequent read/write operations involving the restriped region may be implemented using the new V2P mapping. Thereafter, a determination is made (422) as to whether the restriping of the identified volume has been completed. If restriping of the identified volume has not been completed, then a next active region of the identified volume is selected (412) for restriping operations, as described above.

Figure 7:
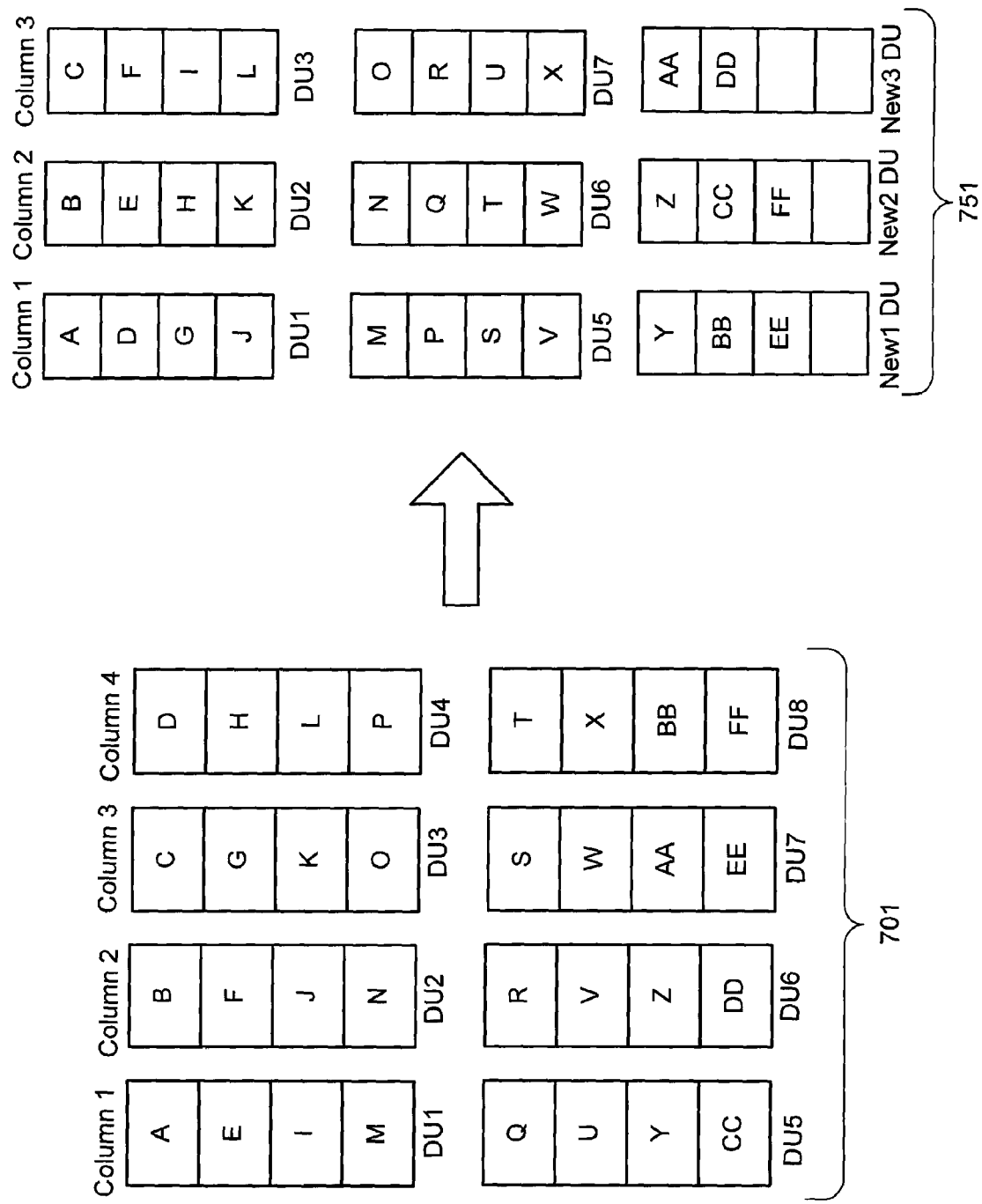
FIG. 7 shows a block diagram illustrating how the restriping technique of the present invention may be used for decreasing the number of columns in a virtual volume.

FIG. 7 shows a block diagram illustrating how the restriping technique of the present invention may be used for decreasing the number of columns in a virtual volume. For example, as illustrated in FIG. 7, the Restripe Volume Columns Procedure may be used to reduce the number of columns of a virtual volume from a 4-column virtual volume 701 to a 3-column virtual volume 751. According to one implementation where the restriping operation includes an increase in the number of columns of the virtual volume (as illustrated, for example, in FIG. 6), the selection of the active regions for restriping may commence starting from the beginning of the identified volume. In a different implementation where the restriping operation includes a decrease in the number of columns of the virtual volume (as illustrated, for example, in FIG. 7), the selection of the active regions for restriping may commence starting from the end of the identified volume.

It will be appreciated that specific embodiments of the online restriping technique of the present invention may be implemented without requiring or using temporary storage in order to perform the restriping operations. Additionally, specific embodiments of the online restriping technique of the present invention may be implemented in a manner which minimizes the number of extra diskunits required for changing or modifying the number of columns in a virtual volume. This feature is described in greater detail below by way of illustrative examples.

In a first example, it is assumed that a volume comprises n columns, and that the size of each column is p diskunits. If it is now desired to increase the number of columns from n to m (where $n<m$), then (m−n) columns of size p diskunits will be created. While creating these columns, it is preferable to comply with any required striping restrictions. For example, in one implementation, the diskunits in a row should preferably be from different PDisks. The example of FIG. 6 illustrates a specific embodiment of how the new volume 651 is configured to include the new diskunits 602, 604. According to a specific embodiment, restriping may then commence starting from the beginning of the volume, wherein data from the first stripe unit in the old volume layout is copied to the first stripe unit in the new volume layout. Once the restriping is finished, the user may be prompted to resize the volume, if desired. According to a specific implementation, the minimum amount by which the volume size may be increased/decreased is m diskunits.

In one online restriping implementation where the number of columns in a virtual volume is to be changed from n to m, where $n<m$, the number of extra diskunits needed for performing the restriping of the virtual volume may be calculated according to: $(m-n)*\text{ceiling}((n*p)/m)$, where p represents the number of diskunits in a column (before restriping), and where $\text{ceiling}((n*p)/m)$ represents the upper integer value obtained from the expression $(n*p)/m$. For example, as shown in FIG. 6, $p=2$, $n=3$, and $m=4$, so the number of extra diskunits may be calculated according to: $(4-3) \text{ceiling}((3*2)/4)=1*2=2$ extra diskunits.

In a second example, it is assumed that a volume comprises n columns, and that the size of each column is p diskunits. If it is now desired to decrease the number of columns from n to m (where $n>m$), then (n−m) column(s) of p diskunits will be removed. While removing these columns, it is preferable to comply with any required striping restrictions. For example, in one implementation, the diskunits in a row should preferably be from different PDisks. The example of FIG. 7 illustrates a specific embodiment of how the new volume 751 is configured to include the new diskunits (e.g., New1 DU, New2 DU, New3 DU). According to a specific embodiment, restriping may then commence starting from the end of the volume, wherein data from the last stripe unit in the old volume layout is copied to the last stripe unit in the new volume layout. Once the restriping is finished, the user may be prompted to resize the volume, if desired.

In one online restriping implementation where the number of columns in a virtual volume is to be changed from n to m, where $n>m$, the number of extra diskunits needed for performing the restriping of the virtual volume may be calculated according to: $m*(\text{ceiling } ((n*p)/m)-p)$, where p represents the number of diskunits in a column (before restriping), and where $\text{ceiling}((n*p)/m)$ represents the upper integer value obtained from the expression $(n*p)/m$. For example, as shown in FIG. 7, $p=2$, $n=4$, and $m=3$, so the number of extra diskunits may be calculated according to: $3*(\text{ceiling}((4*2)/3)-2)=3*(3-2)=3$ extra diskunits.

Changing the Stripe Unite Size During Online Restriping

Figure 5:
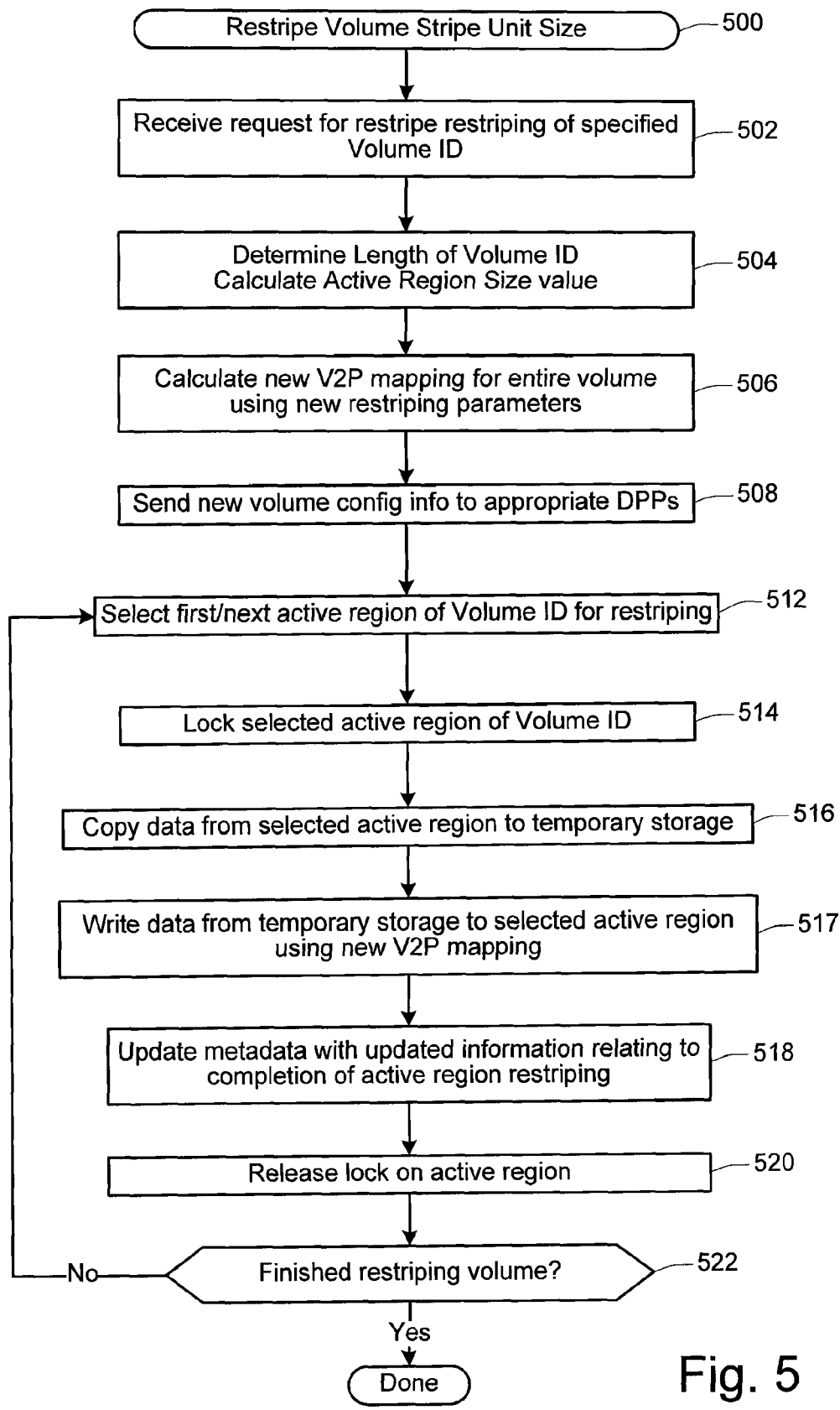
FIG. 5 shows a flow diagram of a Restripe Volume Stripe Unit Size 500 in accordance with a specific embodiment of the present invention.

FIG. 5 shows a flow diagram of a Restripe Volume Stripe Unit Size 500 in accordance with a specific embodiment of the present invention. In at least one implementation, the Restripe Volume Stripe Unit Size may be implemented either automatically or manually, such as, for example, at the request of a network administrator. In at least one implementation, aspects of the Restripe Volume Stripe Unit Size may be implemented at the fabric portion of the storage area network. Additionally, many of the operations depicted in the flow diagram of FIG. 5 are similar to those described previously with respect to the Restripe Volume Columns Procedure of FIG. 4. Accordingly, it will be appreciated that many of the features and/or details relating to the flow described in FIG. 4 are also applicable to the flow of FIG. 5.

Initially, as illustrated at 502, a request is received for restriping a specified volume of the network storage. In at least one implementation, the request may include a variety of parameters such as, for example, a volume ID parameters which may be used for identifying a particular volume for restriping, a restripe type parameter specifying a type of restriping operation to be performed (e.g., change number of columns, change stripe unit size, etc.); a value parameter specifying a value to be used for the restriping operation (e.g., new number of columns, new stripe unit size, etc.); etc. For purposes of illustration, it is assumed that the restripe request corresponds to a request for increasing the stripe unit size (SUS) of virtual volume 801 (FIG. 8) (e.g., from 64 KB to 128 KB).

Figure 8:
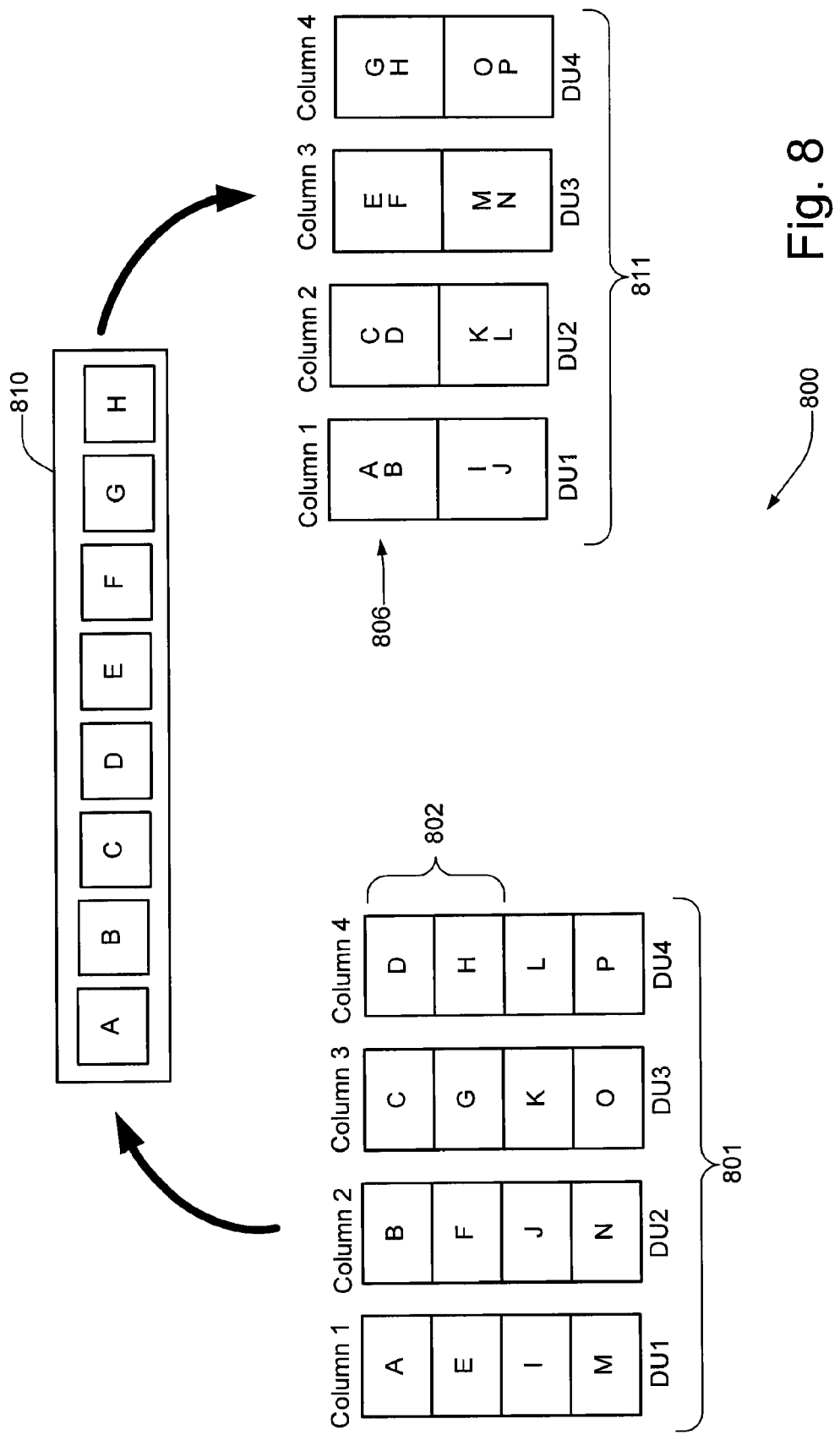
FIG. 8 shows a block diagram illustrating how the restriping technique of the present invention may be used for increasing the stripe unit size of a virtual volume.

FIG. 8 shows a block diagram illustrating how the restriping technique of the present invention may be used for increasing the stripe unit size (SUS) of virtual volume 801. As illustrated in FIG. 8, the virtual volume 801 is comprised of 4 physical Diskunits (PDisk) DU1-DU4, which has been mapped into 4 columns. In at least one embodiment, each of the columns may represent a virtual disk (VDisk) having a size of p diskunits, where p=1 in the example of FIG. 8.

According to lease one embodiment of the present invention, the stripe unit size of the virtual volume may be configured to be a value which is a multiple of the block size (e.g., 512 Bytes) of the physical disks forming the virtual volume. In a preferred implementation, the stripe unit size value may be restricted to values which are power of two (e.g., $2^n$) multiples of the block size. Additionally, in a preferred implementation, each diskunit may include an integral number of stripes. In the example of FIG. 8 each diskunit is shown to include 4 stripe units 803. In this example, it is assumed that the stripe unit size value of the virtual volume 801 is 64 KB.

Returning to FIG. 5, using at least a portion of the information specified in the received restripe request, the length of the volume (corresponding to the specified volume ID) is determined (504). Additionally, an active region size (ARS) value is also determined. In at least one embodiment, the active region size value may be calculated according to the following formula:

Active Region Size Value=$n$*(MAX(OLD_$SUS$, NEW_$SUS$))bytes, where:

$n$ represents the number of columns in the virtual volume;

OLD_SUS represents the old stripe unit size value;

NEW_SUS represents the new stripe unit size value; and

MAX(OLD_SUS, NEW_SUS) represents a function which returns the greater of the two values OLD_SUS, NEW_SUS.

In the present example, the active region size of value may be calculated using the following parameters: n=4, OLD_SUS=64, NEW_SUS=128, which results in an active region size value of 4*128=512 bytes.

Once the specific restriping parameters have been determined, a new virtual-to-physical (V2P) mapping of the entire identified volume may be calculated (506) using the new restriping parameters. The new volume configuration information, which may include the new V2P mapping, may be sent (508) to appropriate display path processors (DPPs).

As shown at 512, a first active region of the identified volume may be selected for restriping. In the present example, the first selected active region may include eight stripe units as shown at 802. In order to minimize the possibility of data corruption during the online restriping operation, the selected active region of the volume may be temporarily locked (514) during the restriping operations.

As shown at 516, the data stored at the selected active region may be copied to temporary storage. An example of the temporary storage is illustrated at 810 of FIG. 8. According to different implementations, the temporary storage may include a volatile and/or non-volatile memory, which, for example, may reside at a switch in the FC fabric or at some other device within the storage area network. In at least one implementation, the byte size of the temporary storage may be configured to be equal to or greater than the byte size of the active region. Additionally and at least one implementation, the byte size of the temporary storage may be configured to be independent of p and the diskunit size.

Once the data from the selected active region has been copied to the temporary storage, the data from the temporary storage may then be written (517) into the selected active region using the new V2P mapping characteristics. Thus, for example, as illustrated in FIG. 8, the 512 KB of data copied from the active region 802 (which includes eight stripe units of 64 KB each) to temporary storage 810 may be written back into the same active region using a new stripe unit size of 128 KB (as illustrated at 806).

After completion of the restriping operation for the currently selected active region, metadata relating to the identified volume may be updated (518) to reflect the completion of restriping for the currently selected active region. Additionally, once the restriping operation for the selected active region has been completed, the selected active region may then be unlocked (520), thereby allowing read/write access to that region. In at least one implementation, subsequent read/write operations involving the restriped region may be implemented using the new V2P mapping. Thereafter, a determination is made (522) as to whether the restriping of the identified volume has been completed. If restriping of the identified volume has not been completed, then a next active region of the identified volume is selected (512) for restriping operations, as described above.

FIG. 9 shows a block diagram illustrating how the restriping technique of the present invention may be used for decrease the stripe unit size (SUS) of virtual volume 901, for example, from 128 KB to 64 KB. In at least one implementation, the changing of the stripe unit size in the example of FIG. 9 may be achieved using the Restripe Volume Stripe Unit Size procedure of FIG. 5.

FIG. 10 shows a block diagram of a representation of a volume 1000 during restriping operations in accordance with a specific embodiment of the present invention. According to a specific embodiment, a volume may be divided into three regions while restriping is in progress: (1) an restripe ALREADY-DONE region 1002 in which restriping operations have been completed; (2) a restripe ACTIVE region in which restriping operations are currently being performed; and a restripe YET-TO-BE-DONE region in which restriping operations have not yet been performed. As stated previously, the restripe engine copies the data in ACTIVE region from the old V2P layout to the new V2P layout.

FIG. 11 shows a flow diagram of a Volume Data Access Procedure 1100 in accordance with a specific embodiment of the present invention. In at least one implementation, the Volume Data Access Procedure may be used for handling user (e.g., host) requests for accessing data in a volume undergoing restriping operations. According to a specific embodiment, the Volume Data Access Procedure may be implemented at one or more switches and/or iPorts in the FC fabric.

As illustrated in the embodiment of FIG. 11, when a request for accessing a specified location in the volume is received (1102), the Volume Data Access Procedure determines (1104) the region (e.g., ALREADY-DONE, ACTIVE, or YET-TO-BE-DONE) in which the specified location is located. If it is determined that the specified location is located in the ALREADY-DONE region, then the specified location may be accessed (1106) using the new V2P mapping. If it is determined that the specified location is located in the YET-TO-BE-DONE region, then the specified location may be accessed (1110) using the old V2P mapping (e.g., the V2P mapping before restriping). If it is determined that the specified location is located in the ACTIVE region, or if there is any overlap with the ACTIVE region, then the access request is held (1108) until the ACTIVE region is unlocked, after which the specified location may be accessed using the new V2P mapping. According to a specific embodiment, at least a portion of this process may be handled by the active region locking/unlocking infrastructure.

In at least one implementation, the restripe engine may be configured or designed to automatically and periodically notify the iPorts servicing the volume of the current ACTIVE region. The restripe engine may also log the value of the start of the ACTIVE region to stable storage. This may be performed in order to facilitate recovery in the case of restripe engine failure.

According to a specific implementation, after completing the restripe operations for the entire volume, the restripe engine may notify the VM. In the event that the restripe engine goes down, the VM may automatically detect the restripe engine failure, assign a new restripe engine. Once the restripe engine is instantiated, it may consult the log manager (e.g., metadata) to find out the current ACTIVE region for volume being restriped.

It will be appreciated that the restriping technique of the present invention provides a number of advantages over conventional restriping techniques. For example, one advantage provided by the technique of the present invention is that it may be used perform in-place restriping operations in which the original diskunits are utilized (when possible). Additionally, the online restriping technique of the present invention provides for improved efficiencies with regard to network resource utilization and time. Additionally, in at least one implementation the online restriping technique of the present invention may utilize hardware assist in performing data comparison and copying operations, thereby offloading such tasks from the CPU.

Another advantage of the restriping technique of the present invention is that it is able to used in presence of multiple instances of an online volume, without serializing the host accesses to the volume. For example, in at least one implementation, individual iports may be provided with functionality for independently performing I/O operations at the volume while it is concurrently being restriped. This feature provides the additional advantage of enabling increased I/O operations per second since multiple ports or iports are able to each perform independent I/O operations simultaneously.

Figure 13:
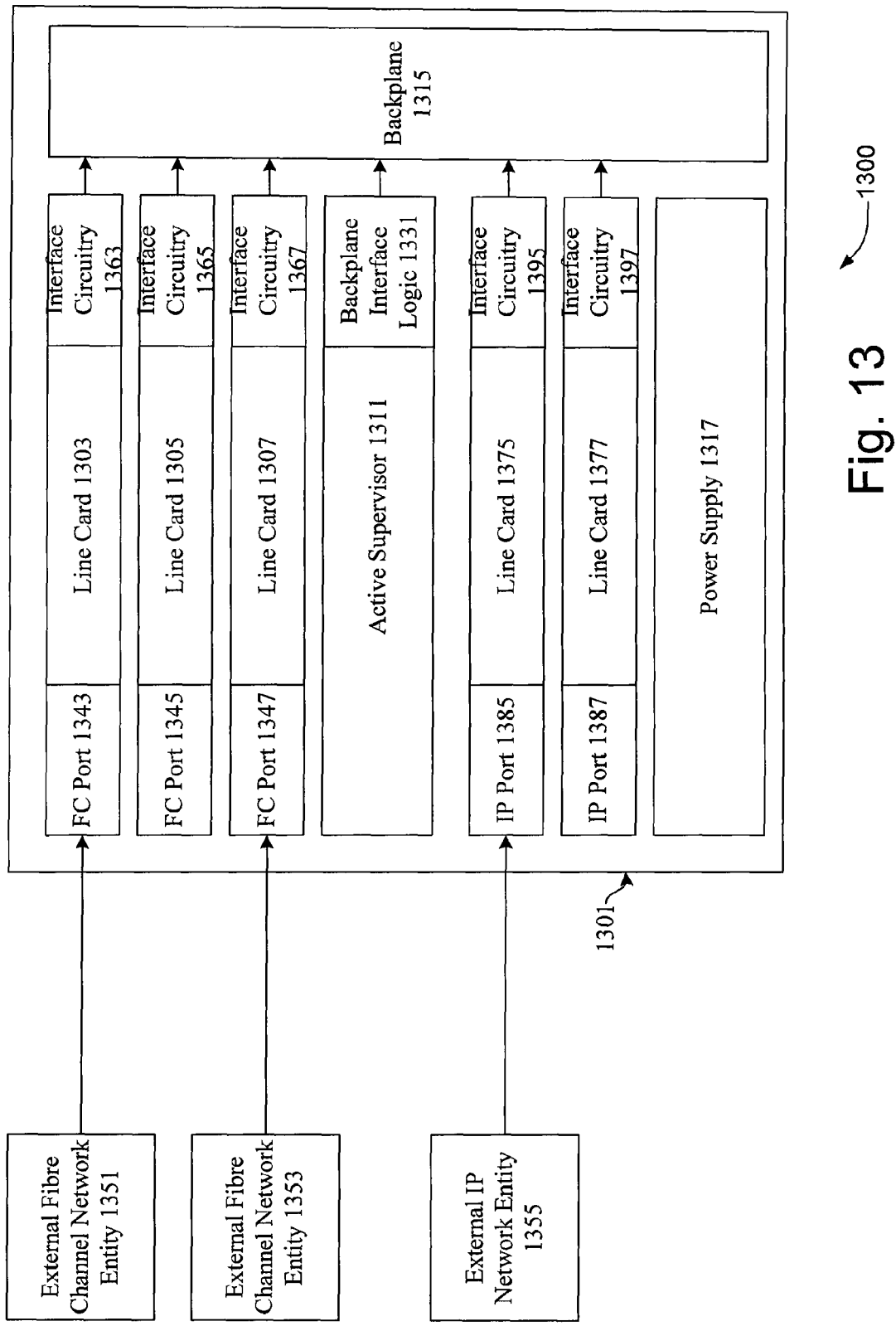
FIG. 13 is a diagrammatic representation of one example of a fibre channel switch that can be used to implement techniques of the present invention.

FIG. 13 is a diagrammatic representation of one example of a fibre channel switch that can be used to implement techniques of the present invention. Although one particular configuration will be described, it should be noted that a wide variety of switch and router configurations are available. The switch 1301 may include one or more supervisors 1311 and power supply 1317. According to various embodiments, the supervisor 1311 has its own processor, memory, and storage resources.

Line cards 1303, 1305, and 1307 can communicate with an active supervisor 1311 through interface circuitry 1363, 1365, and 1367 and the backplane 1315. According to various embodiments, each line card includes a plurality of ports that can act as either input ports or output ports for communication with external fibre channel network entities 1351 and 1353. An example of at least a portion of a line card is illustrated in FIG. 3B of the drawings.

The backplane 1315 can provide a communications channel for all traffic between line cards and supervisors. Individual line cards 1303 and 1307 can also be coupled to external fibre channel network entities 1351 and 1353 through fibre channel ports 1343 and 1347.

External fibre channel network entities 1351 and 1353 can be nodes such as other fibre channel switches, disks, RAIDS, tape libraries, or servers. The fibre channel switch can also include line cards 1375 and 1377 with IP ports 1385 and 1387. In one example, IP port 1385 is coupled to an external IP network entity 1355. The line cards 1375 and 1377 also have interfaces 1395 and 1397 to the backplane 1315.

It should be noted that the switch can support any number of line cards and supervisors. In the embodiment shown, only a single supervisor is connected to the backplane 1315 and the single supervisor communicates with many different line cards. The active supervisor 1311 may be configured or designed to run a plurality of applications such as routing, domain manager, system manager, and utility applications. The supervisor may include one or more processors coupled to interfaces for communicating with other entities.

According to one embodiment, the routing application is configured to provide credits to a sender upon recognizing that a packet has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

This application is related to U.S. patent application Ser. No. 10/045,883, entitled "METHODS AND APPARATUS FOR IMPLEMENTING VIRTUALIZATION OF STORAGE WITHIN A STORAGE AREA NETWORK THROUGH A VIRTUAL ENCLOSURE", naming Kumar et al. as inventors, filed on Jan. 9, 2002, the entirety of which is incorporated herein by reference for all purposes.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

The invention claimed is:

1. A method of implementing online restriping of a volume in a storage area network, the storage area network including a fibre channel fabric comprised of a plurality of switches which are operable to communicate using a Fibre Channel protocol, the fibre channel fabric including a plurality of ports, the method comprising:
    instantiating, by a first port of a first switch of the fibre channel fabric, a first instance of the volume for enabling I/O operations to be performed at the volume;
    performing restriping operations at the volume; and
    enabling the first port to perform I/O operations at the volume using the first instance of the volume concurrently while at least a portion of the restriping operations are being performed at the volume.

2. The method of claim 1:
    wherein the instantiating of the first instance of the volume is implemented by the first port.

3. The method of claim 1:
    wherein the first instance of the volume is instantiated by the first switch of the fibre channel fabric.

4. The method of claim 1 further comprising:
    instantiating, by a second port of a second switch of the fibre channel fabric, a second instance of the volume for enabling I/O operations to be performed at the volume, wherein the instantiating of the second instance of the first volume is implemented by the second port; and
    enabling the second port to perform I/O operations at the volume using the second instance of the volume concurrently while at least a portion of the restriping operations are being performed at the volume, and concurrently while the first port is performing I/O operations at the volume.

5. The method of claim 1 wherein the restriping operations include changing a number of columns of the volume.

6. The method of claim 1 where in the restriping operations include changing a stripe unit size of the volume.

7. The method of claim 1 wherein the restriping operations include changing a stripe unit size of the volume, the method further comprising:
    generating a new volume mapping based at least in part upon a desired value of a new stripe unit size of the volume;
    selecting a first active region for performing a first portion of restriping operations, wherein a size of the first active region is B bytes;
    copying at data from the first active region to a temporary storage location; and
    copying the data from the temporary storage location to the first active region using the new volume mapping.

8. The method of claim 1 further comprising:
    selecting a first active region of the volume for executing a first portion of restriping operations;
    locking of the first active region during execution of the first portion of restriping operations, wherein the locking of the first active region includes denying read/write access to the first active region.

9. The method of claim 1 further comprising:
    receiving a first request for accessing a first location of the volume;
    determining that the first location corresponds to an ACTIVE region of the volume where a first portion of restriping operations are being performed; and
    delaying processing of the first request until it has been determined that the first portion of the restriping operations has been completed.

10. A system of implementing online restriping of a volume in a storage area network, the storage area network including a fibre channel fabric comprised of a plurality of switches which are operable to communicate using a Fibre Channel protocol, the fibre channel fabric including a plurality of ports, the system comprising:
    at least one processor;
    at least one interface operable to provide a communication link to at least one other network device in the storage area network; and
    memory;
    the system being operable to:
    instantiate, by a first port of a first switch of the fibre channel fabric, a first instance of the volume for enabling I/O operations to be performed at the volume, wherein the instantiating of the first instance of the first volume is implemented by the first port;
    perform restriping operations at the volume; and
    enable the first port to perform I/O operations at the volume using the first instance of the volume concurrently while at least a portion of the restriping operations are being performed at the volume.

11. The system of claim 10 being further operable to:
    instantiate, by a second port of a second switch of the fibre channel fabric, a second instance of the volume for enabling I/O operations to be performed at the volume, wherein the instantiating of the second instance of the volume is implemented by the second port; and
    enable the second port to perform I/O operations to be performed at the volume using the second instance of the volume concurrently while at least a portion of the restriping operations are being performed at the volume, and concurrently while the first port is performing I/O operations at the volume.

12. The system of claim 10 wherein the restriping operations include changing a number of columns of the volume.

13. The system of claim 10 where in the restriping operations include changing a stripe unit size of the volume.

14. The system of claim 10 where in the restriping operations include changing a stripe unit size of the volume, the system being further operable to:
    generate a new volume mapping based at least in part upon a desired value of a new stripe unit size of the volume;
    select a first active region for performing a first portion of restriping operations, wherein a size of the first active region is B bytes;
    copy at data from the first active region to a temporary storage location; and
    copy the data from the temporary storage location to the first active region using the new volume mapping.

15. The system of claim 10 being further operable to:
    select a first active region of the volume for executing a first portion of restriping operations;

lock of the first active region during execution of the first portion of restriping operations, wherein the locking of the first active region includes denying read/write access to the first active region.

16. The system of claim 10 being further operable to:

receive a first request for accessing a first location of the volume;

determine that the first location corresponds to an ACTIVE region of the volume where a first portion of restriping operations are being performed; and delay processing of the first request until it has been determined that the first portion of the restriping operations has been completed.

17. A switch of a fibre channel fabric in a storage area network, the switch comprising:

a first port;

at least one processor;

at least one interface operable to provide a communication link to at least one other network device in the storage area network; and memory;

the switch being operable to:

instantiate, at the first port, a first instance of the volume for enabling I/O operations to be performed at the volume;

perform restriping operations at the volume; and enable I/O operations to be performed at the volume using the first instance of the volume concurrently while at least a portion of the restriping operations are being performed at the volume.

18. The switch of claim 17 wherein the instantiating of the first instance of the volume is implemented by the first port.

19. The switch of claim 17 further comprising:

a second port;

the switch being further operable to:

instantiate, at the second port, a second instance of the first volume for enabling second I/O operations to be performed at the volume, wherein the instantiating of the second instance of the volume is implemented by the second port; and enable the second port to perform the second I/O operations at the volume using the second instance of the volume concurrently while the first restriping operations are being performed, and concurrently while the first port is performing first I/O operations at the volume;

wherein the first I/O operations are performed independently of the second I/O operations.

20. The switch of claim 17 being further configured or designed to:

enable I/O operations to be performed at the volume without serializing access to the volume.

21. The switch of claim 17 being further operable to implement a first plurality of restriping operations relating to changing of a stripe unit size of the volume, the first plurality of restriping operations comprising:

generating a new volume mapping based at least in part upon a desired value of a new stripe unit size of the volume;

selecting a first active region for performing a first portion of restriping operations, wherein a size of the first active region is B bytes;

copying data from the first active region to a temporary storage location; and copying data from the temporary storage location to the first active region using the new volume mapping.

22. The switch of claim 17 being further operable to:

select a first active region of the volume for executing a first portion of restriping operations;

lock of the first active region during execution of the first portion of restriping operations, wherein the locking of the first active region includes denying read/write access to the first active region.

23. The switch of claim 17 being further operable to:

receive a first request for accessing a first location of the volume;

determine that the first location corresponds to an ACTIVE region of the volume where a first portion of restriping operations are being performed; and delay processing of the first request until it has been determined that the first portion of the restriping operations has been completed.

24. A system of implementing online restriping of a volume in a storage area network, the storage area network including a fibre channel fabric comprised of a plurality of switches which are operable to communicate using a Fibre Channel protocol, the fibre channel fabric including a plurality of ports, the system comprising:

means for instantiating, by a first port of a first switch of the fibre channel fabric, a first instance of the volume for enabling I/O operations to be performed at the volume;

means for performing restriping operations at the volume;

means for enabling the first port to perform I/O operations at the volume using the first instance of the volume concurrently while at least a portion of the restriping operations are being performed at the volume;

means for instantiating, by a second port of a second switch of the fibre channel fabric, a second instance of the volume for enabling I/O operations to be performed at the volume, wherein the instantiating of the second instance of the first volume is implemented by the second port; and means for enabling the second port to perform I/O operations to be performed at the volume using the second instance of the volume concurrently while at least a portion of the restriping operations are being performed at the volume, and concurrently while the first port is performing I/O operations at the volume.

* * * * *